(12) United States Patent
Lang et al.

(10) Patent No.: US 11,988,644 B1
(45) Date of Patent: May 21, 2024

(54) IN-SITU BOLLARD TESTER

(71) Applicant: The United States of America, as represented by the Secretary of the Navy, Arlington, VA (US)

(72) Inventors: Gerritt E. Lang, Ventura, CA (US); Elaina Ryan, Camarillo, CA (US); Juan Carrillo, Oxnard, CA (US); Ricardo Contreras, Santa Maria, CA (US); Zachary Harwood, Ventura, CA (US); Benjamin Hulbert, San Diego, CA (US); Dennis Michael How, Camarillo, CA (US); Timothy Paul Kurtin, II, Oxon Hill, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 299 days.

(21) Appl. No.: 17/705,496

(22) Filed: Mar. 28, 2022

Related U.S. Application Data

(63) Continuation-in-part of application No. 17/529,428, filed on Nov. 18, 2021, which is a
(Continued)

(51) Int. Cl.
*G01N 3/10* (2006.01)
*B63B 21/06* (2006.01)
(Continued)

(52) U.S. Cl.
CPC ............... *G01N 3/10* (2013.01); *G01N 3/08* (2013.01); *B63B 21/06* (2013.01); *E02B 3/20* (2013.01);
(Continued)

(58) Field of Classification Search
CPC .. G01N 3/10; G01N 3/08; G01N 3/04; G01N 2203/0244; G01N 2203/0017;
(Continued)

(56) References Cited

FOREIGN PATENT DOCUMENTS

| CN | 203132753 U | 8/2013 |
|----|----|----|
| GB | 2502993 | 12/2013 |
| WO | WO 2015114380 | 8/2015 |

OTHER PUBLICATIONS

Bollard Load Testing, Ltd., Technical Data, BLT system, catalog, South Shields, England http://bollardloadtest.com/technical-data/.
(Continued)

*Primary Examiner* — Jonathan M Dunlap
(74) *Attorney, Agent, or Firm* — Naval Facilities Engineering and Expeditionary Warfare Center; Jimmy M. Sauz

(57) ABSTRACT

An in-situ bollard tester. The in-situ bollard tester may comprise: a frame, cable, and tensioner. The frame may mount onto a pier and around a bollard to provide structural support for the cable and tensioner. The frame may comprise a pair of base assemblies and a spreader bar. Each of the base assemblies may comprise a support frame and a cantilever arm, and the spreader bar may be coupled to the pair of base assemblies. A pair of jacks are coupled near proximal corners of the base assemblies. The tensioner may comprise a pair of hydraulic arms having first ends coupled near a proximal end of the base assemblies and a linear crossmember coupled to the second ends of the hydraulic arms. The cable may fasten to the bollard, and the tensioner may apply tension to the cable at various load angles in order to test the integrity of the bollard.

20 Claims, 15 Drawing Sheets

Related U.S. Application Data continuation-in-part of application No. 16/777,460, filed on Jan. 30, 2020, now Pat. No. 11,215,541.

(51) Int. Cl.
  *G01M 5/00* (2006.01)
  *G01N 3/04* (2006.01)
  *G01N 3/08* (2006.01)
  *E02B 3/20* (2006.01)
  *E02B 3/24* (2006.01)

(52) U.S. Cl.
  CPC ............... *E02B 3/24* (2013.01); *G01M 5/005* (2013.01); *G01M 5/0075* (2013.01); *G01N 3/04* (2013.01); *G01N 2203/0017* (2013.01); *G01N 2203/0048* (2013.01); *G01N 2203/0244* (2013.01)

(58) Field of Classification Search
  CPC ... G01N 2203/0048; B63B 21/06; E02B 3/24; E02B 3/20; G01M 5/0075; G01M 5/005
  See application file for complete search history.

(56) References Cited

OTHER PUBLICATIONS

Trelleborg Marine Systems, Docking and Mooring, catalog, Houston, Texas, United States, https://www.trelleborg.com/en/marine-and-infrastructure/products-solutions-and-servi.

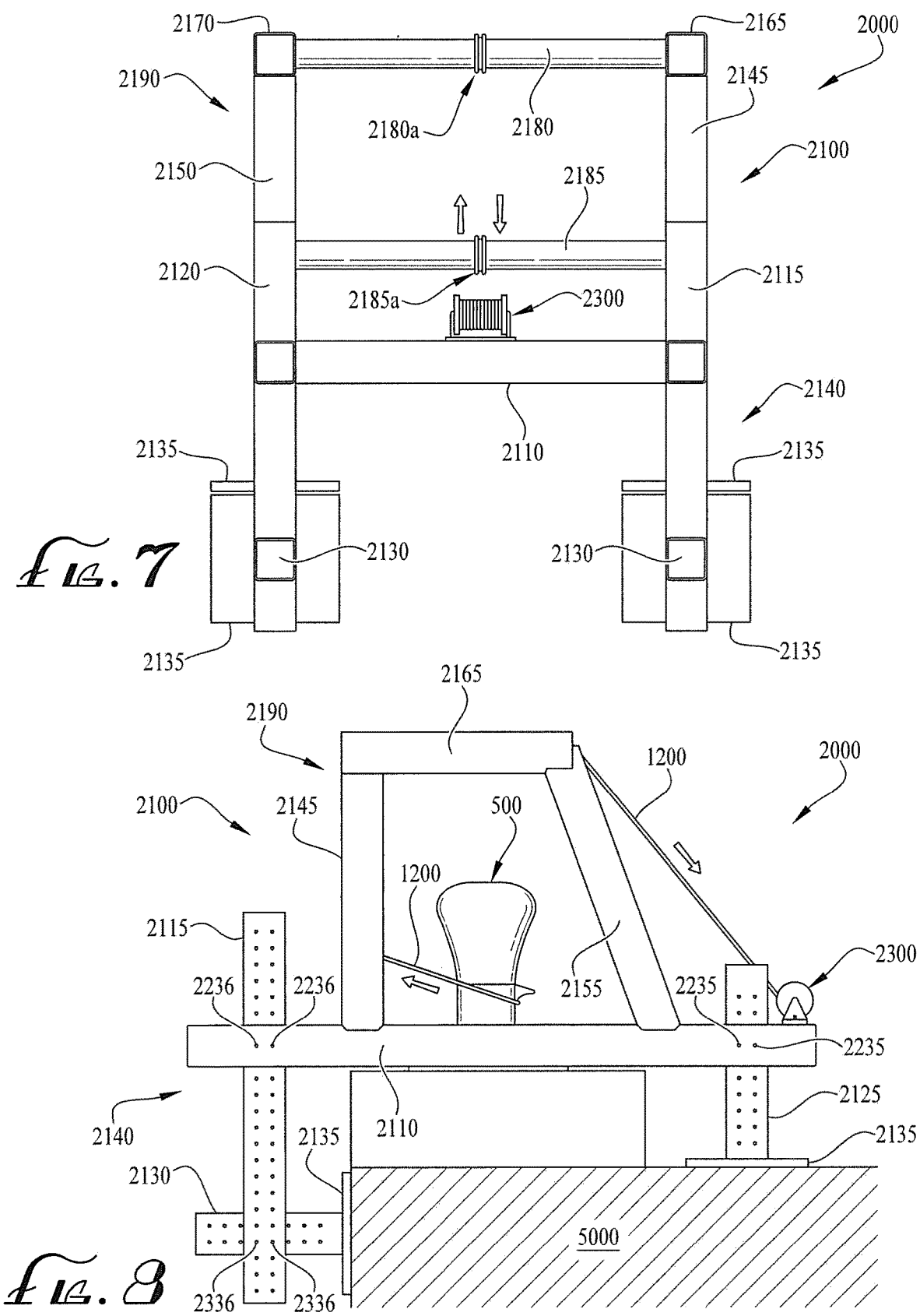

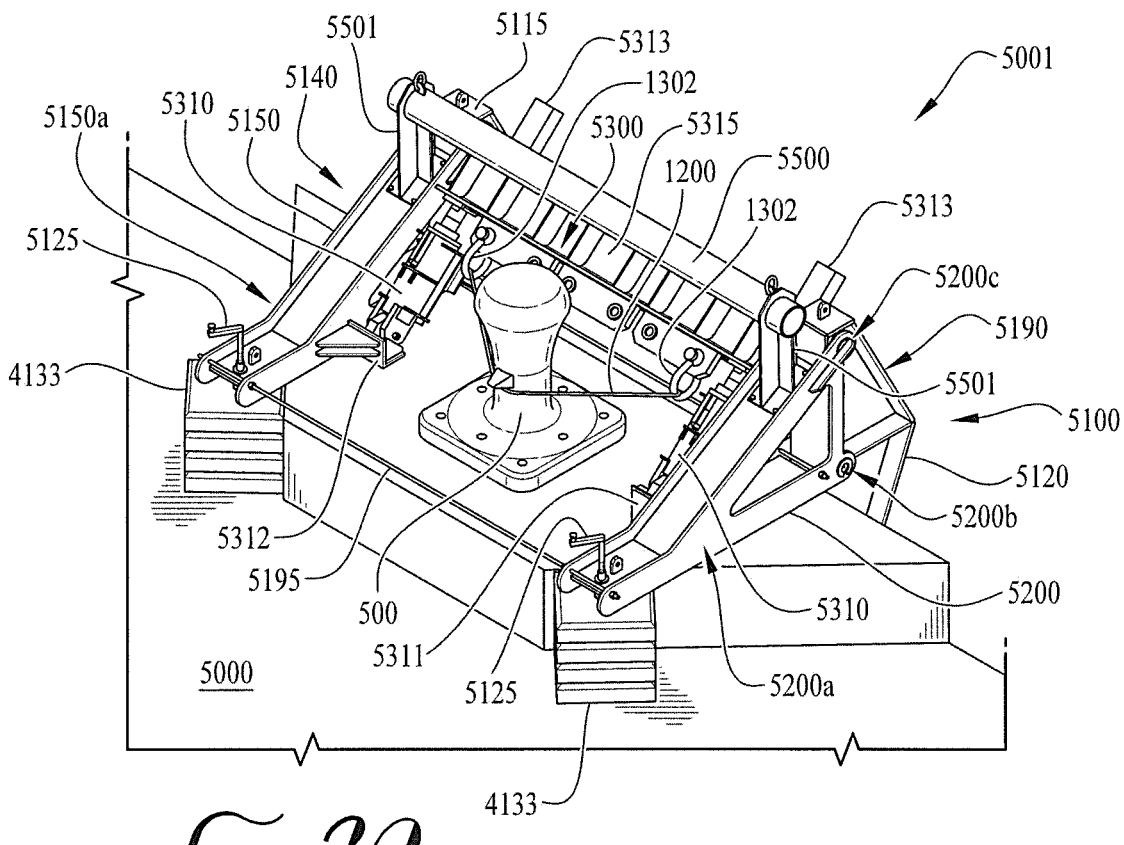
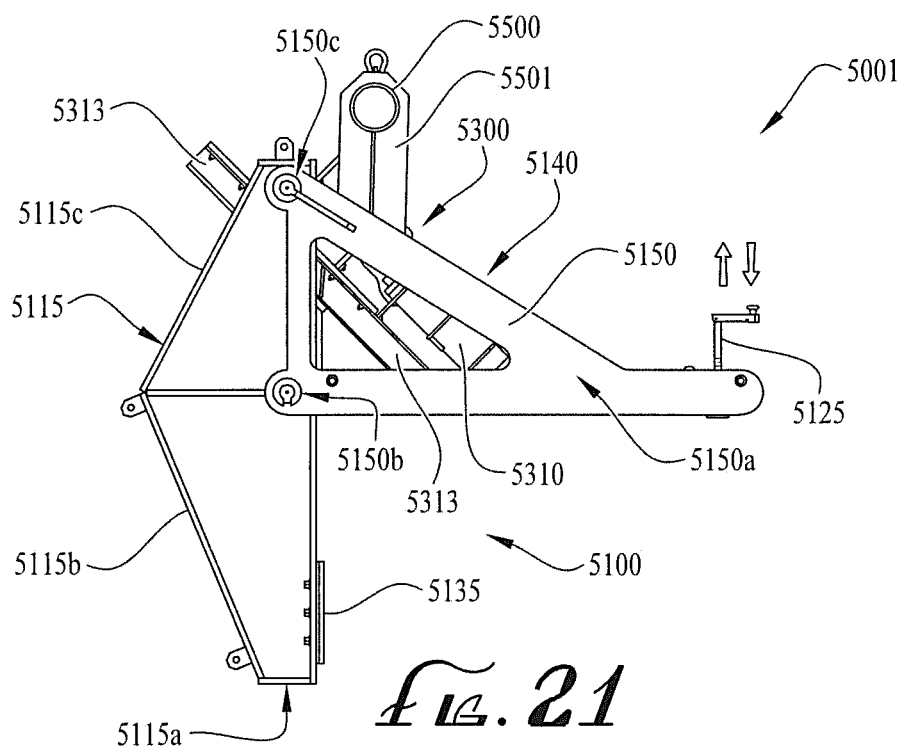

IN-SITU BOLLARD TESTER

CROSS-REFERENCE TO RELATED APPLICATIONS

This application is a continuation-in-part patent application of the commonly owned U.S. patent application Ser. No. 17/529,428, titled "In-situ Bollard Tester," filed on Nov. 18, 2021 by co-inventors Gerritt E. Lan& Elaina Ryan, Juan Carrillo, Ricardo Contreras, Zachary Harwood, Benjamin Hulbert, Dennis Michael How, and Timothy Paul Kurtin II, the contents of which are hereby expressly incorporated herein by reference in its entirety and to which priority is claimed. U.S. patent application Ser. No. 17/529,428 is a continuation-in-part patent application of the commonly owned U.S. Pat. No. 11,215,541, titled "In-situ Bollard Tester," issued on Jan. 4, 2022 by co-inventors Gerritt E. Lang, Elaina Ryan, Juan Carrillo, Ricardo Contreras, Zachary Harwood, and Benjamin Hulbert, the contents of which are also hereby expressly incorporated herein by reference in its entirety and to which priority is claimed.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF USE

The present disclosure relates generally to apparatuses for testing the integrity of mooring bollards, bitts, and cleats on piers and wharves.

BACKGROUND

In-situ tests are the preferred method in determining whether bollards and other mooring hardware are performing at their design capacity. There is, however, no accepted standard testing device and procedure. If a bollard is degraded, a ship's mooring line may break the bollard, resulting in damage to the ship and creating a dangerous situation. Past bollard test procedures have included the use of tugboats, which is dangerous and not representative of vertical mooring line angles that may cause uplift on the bollards. In this regard, there is a need for improvement to develop a safe device and procedure for testing bollards in-situ.

SUMMARY OF ILLUSTRATIVE EMBODIMENTS

To minimize the limitations in the related art and other limitations that will become apparent upon reading and understanding the present specification, the following discloses embodiments of a new and useful in-situ bollard tester.

One embodiment may be an in-situ bollard tester, comprising: a frame, comprising: a rectangular frame; a first pair of legs coupled near proximal corners of the rectangular frame; and a pair of hanging columns coupled near distal corners of the rectangular frame, wherein lower ends of the pair of hanging columns comprise a second pair of legs orthogonal to the pair of hanging columns; and a tensioner comprising: a pair of posts having lower ends removably attached near a distal end of the rectangular frame; a pair of hydraulic arms having lower ends removably attached near a proximal end of the rectangular frame; and a linear crossmember attached to upper ends of the pair of hydraulic arms, the linear crossmember being in a sliding relationship with upper ends of the pair of posts; and a cable having first and second ends coupled near opposing ends of the linear crossmember. The cable may snugly wrap around a bollard when the first and second ends of the cable are attached to the linear crossmember. The in-situ bollard tester may further comprise one or more first pairs of lock pins and one or more first pairs of mounting holes located near the proximal corners of the rectangular frame; wherein each of the first pair of legs may comprise a first plurality of holes evenly spaced and adapted to mate with the one or more first pairs of lock pins to securely lock the first pair of legs to the rectangular frame. The in-situ bollard tester may further comprise one or more second pairs of lock pins and one or more second pairs of mounting holes located near the distal corners of the rectangular frame; wherein each of the pair of hanging columns may comprise a second plurality of holes evenly spaced and adapted to mate with the one or more second pairs of lock pins to securely lock the pair of hanging columns to the rectangular frame. The in-situ bollard tester may further comprise one or more third pairs of lock pins adapted to engage with the second plurality of holes; and wherein each of the second pair of legs may comprise a third plurality of holes evenly spaced and adapted to mate with the one or more third pairs of lock pins to securely lock the second pair of legs to the pair of hanging columns. The in-situ bollard tester may further comprise a pair of shackles coupled near opposing ends of the linear crossmember and each having a load pin sensor adapted for measuring a cable tension; wherein the opposing ends of the cables may be coupled to the pair of shackles, such that the load pin sensors may measure a cable tension of the cable.

Another embodiment may be an in-situ bollard tester, comprising: a frame, comprising: a rectangular frame disposed along a first horizontal plane; a first pair of legs coupled near proximal corners of the rectangular frame and arranged in parallel, the first pair of legs being orthogonal to the rectangular frame; and a pair of hanging columns coupled near distal corners of the rectangular frame and arranged in parallel, the pair of hanging columns being orthogonal to the rectangular frame, such that the pair of hanging columns are disposed along on a vertical plane; wherein lower ends of the pair of hanging columns may comprise a second pair of legs arranged in parallel, the second pair of legs being orthogonal to the pair of hanging columns, such that the second pair of legs may be disposed along a second horizontal plane; a tensioner comprising: a pair of posts having lower ends removably attached near a distal end of the rectangular frame; a pair of hydraulic arms having lower ends removably attached near a proximal end of the rectangular frame and in an angular relationship with the rectangular frame; and a linear crossmember attached to upper ends of the pair of hydraulic arms, wherein the linear crossmember may be in a sliding relationship with upper ends of the pair of posts; and a cable having first and second ends coupled near opposing ends of the linear crossmember. The cable may be adapted to snugly wrap around a bollard when the first and second ends of the cable are attached to the linear crossmember. The in-situ bollard tester may further comprise one or more first pairs of lock pins and one or more first pairs of mounting holes located near the proximal corners of the rectangular frame; wherein each of the first pair of legs may comprise a first plurality of holes evenly spaced and adapted to mate with the one or more first pairs of lock pins to securely lock the first pair of legs to the rectangular frame, such that the frame may be adjustable in height. The in-situ bollard tester may further comprise one or more second pairs of lock pins and one or more second pairs of mounting holes located near the distal corners of the rectangular frame; wherein each of the pair of hanging columns may comprise a second plurality of holes evenly spaced and adapted to mate with the one or more second pairs of lock pins to securely lock the pair of hanging columns to the rectangular frame, such that the frame may be adjustable in height. The in-situ bollard tester may further comprise one or mom third pairs of lock pins adapted to engage with the second plurality of holes; wherein each of the second pair of legs may comprise a third plurality of holes evenly spaced and adapted to mate with the one or more third pairs of lock pins to securely lock the second pair of legs to the pair of hanging columns. The in-situ bollard tester may further comprise a pair of shackles coupled near opposing ends of the linear crossmember, wherein each of the pair of shackles may comprise a load pin sensor adapted for measuring a cable tension; wherein the opposing ends of the cables may be coupled to the pair of shackles, such that the load pin sensors may measure a cable tension of the cable.

Another embodiment may be an in-situ bollard tester, comprising: a frame having an upper frame portion and a lower frame portion; wherein the lower frame portion comprises: a rectangular frame disposed along a first horizontal plane; a first pair of legs coupled near proximal corners of the rectangular frame and arranged in parallel, the first pair of legs being orthogonal to the rectangular frame; and a pair of hanging columns coupled near distal corners of the rectangular frame and arranged in parallel, the pair of hanging columns being orthogonal to the rectangular frame, such that the pair of hanging columns are disposed along a first vertical plane; wherein lower ends of the pair of banging columns comprise a second pair of legs arranged in parallel, the second pair of legs being orthogonal to the pair of hanging columns, such that the second pair of legs are disposed along a second horizontal plane; wherein the upper frame portion comprises: a pair of posts disposed in parallel and having lower ends attached to the rectangular frame, the pair of posts being disposed along a second vertical plane; and a first linear crossmember extending between upper ends of the pair of posts; a winch centrally mounted on a proximal end of the rectangular frame; and a cable having a first end operably coupled to the winch. The upper frame portion may further comprise: a pair of struts having lower ends attached to the rectangular frame; a pair of beams disposed in parallel and attached to upper ends of the pair of struts and the pair of posts, the pair of beams being disposed on a third horizontal plane; and a second linear crossmember extending between the pair of beams. The in-situ bollard tester may further comprise a third linear crossmember coupled between the pair of posts. The third linear crossmember may removably attach between the pair of posts and below the first linear crossmember, such that the third linear crossmember may be adjustable in height. The first, second, and third linear crossmembers may each comprise a sheave centrally disposed. The in-situ bollard tester may further comprise one or more first pairs of lock pins and one or more first pairs of mounting holes located near the proximal corners of the rectangular frame; and wherein each of the first pair of legs may comprise a first plurality of holes evenly spaced and adapted to mate with the one or more first pairs of lock pins to securely lock the first pair of legs to the rectangular frame, such that the frame may be adjustable in height. The in-situ bollard tester may further comprise one or more second pairs of lock pins and one or more second pairs of mounting holes located near the distal corners of the rectangular frame; wherein each of the pair of hanging columns may comprise a second plurality of holes evenly spaced and adapted to mate with the one or more second pairs of lock pins to securely lock the pair of hanging columns to the rectangular frame, such that the frame is adjustable in height. The in-situ bollard tester may further comprise one or more third pairs of lock pins adapted to engage the second plurality of holes; wherein the second pair of legs may each comprise a third plurality of holes evenly spaced and adapted to mate with the one or more third pairs of lock pins to securely lock the second pair of legs to the pair of hanging columns.

Another embodiment may be an in-situ bollard tester, comprising: a frame, comprising: a pair of base assemblies arranged in parallel, each comprising: a support frame having at least one side disposed along a horizontal plane; and a cantilever arm attached to a distal end of the support frame and having a projecting end disposed along a vertical plane; and a spreader bar coupled to the pair of base assemblies; a tensioner comprising: a pair of hydraulic arms disposed in parallel between the pair of support frames and each having a lower end pivotally coupled near proximal ends of the pair of support frames, the pair of hydraulic arms being in an angular relationship with the horizontal plane; and a linear crossmember attached to upper ends of the pair of hydraulic arms; and a cable having first and second ends coupled near opposing ends of the linear crossmember. The in-situ bollard tester may further comprise a pair of jacks coupled near the proximal ends of the support frames. The tensioner may further comprise a pair of rails having first end portions extending from beneath the pair of hydraulic arms; wherein the linear crossmember may be in a sliding relationship with the pair of rails, such that the pair of rails may be adapted to guide the linear crossmember. The tensioner may further comprise a pair of auxiliary arms having first ends pivotally coupled to midportions of the pair of rails and second ends pivotally coupled near distal ends of the pair of support frames. The in-situ bollard tester may further comprise a pair of shackles coupled near opposing ends of the linear crossmember and each having a load pin sensor adapted for measuring a cable tension; wherein the opposing ends of the cables may be coupled to the pair of shackles, such that the load pin sensors may be adapted to measure the cable tension of the cable. The in-situ bollard tester may further comprise: a first tension rod having opposing ends coupled near proximal ends of the pair of support frames; and a second tension rod having opposing ends coupled near distal ends of the pair of support frames. The projecting ends of the pair of cantilever arms may comprise base plates.

Another embodiment may be an in-situ bollard tester, comprising: a frame, comprising: first and second base assemblies arranged in parallel; and a spreader bar coupled to the first and second base assemblies; wherein the first base assembly comprises: a first support frame substantially triangular in shape and having a first vertex near a proximal end and second and third vertices near A distal end, the first support frame having at least one side disposed along a horizontal plane; and a first cantilever arm coupled to the distal end of the first support frame and having a projecting end disposed along a vertical plane; wherein the second base assembly may comprise: a second support frame substantially triangular in shape and having a first vertex near a proximal end and second and third vertices near a distal end, the second support frame having at least one side disposed along the horizontal plane; and a second cantilever arm coupled to the distal end of the second support frame and having a projecting end disposed along the vertical plane; a tensioner comprising: first and second hydraulic arms disposed in parallel between the first and second support frames and each having lower ends pivotally coupled near the first vertices of the first and second support frames, respectively, the first and second hydraulic arms being in an angular relationship with the horizontal plane; a linear crossmember attached to upper ends of the first and second hydraulic arms; and a cable having first and second ends coupled near opposing ends of the linear crossmember. The in-situ bollard tester may further comprise a pair of jacks coupled near the proximal ends of the first and second support frames. The tensioner may further comprise first and second rails, respectively, wherein first end portions of the first and second rails may be attached beneath the first and second hydraulic arms and may extend therefrom, respectively, and wherein the linear crossmember may be in a sliding relationship with the first and second rails, such that the first and second rails may be adapted to guide the linear crossmember. The tensioner may further comprise first and second auxiliary arms, each having a first end and a second end; wherein the first ends of the first and second auxiliary arms may be pivotally coupled to midportions of the first and second rails, respectively; and wherein the second ends of the first and second auxiliary arms may be pivotally coupled near distal ends of the first and second support frames, respectively. The linear crossmember may further comprise a plurality of mounting holes disposed along therewith; wherein the in-situ bollard tester may further comprise a pair of shackles adapted to couple to the plurality of mounting holes, each of the pair of shackles having a load pin sensor adapted for measuring a cable tension; and wherein the opposing ends of the cables may be coupled to the pair of shackles, such that the load pin sensors may be adapted to measure the cable tension of the cable. The in-situ bollard tester may further comprise: a first tension rod having opposing ends coupled near proximal ends of first and second support frames; and a second tension rod having opposing ends coupled near distal ends of the first and second support frames. The projecting ends of the first and second cantilever arms may comprise base plates.

Another embodiment may be an in-situ bollard tester, comprising: a frame, comprising: first and second base assemblies arranged substantially in parallel; and a spreader bar coupled to top portions of the first and second base assemblies; wherein the first base assembly may comprise: a first support frame substantially triangular in shape and having a first vertex near a proximal end and second and third vertices near a distal end, the first support frame having at least one side disposed along a horizontal plane; and a first cantilever arm comprising a first base portion and a first cantilever portion, the first base portion being coupled to the distal end of the first support frame and the first cantilever portion projecting vertically downwardly and having a first projecting end being orthogonal to the horizontal plane, such that the first projecting end may be disposed along a vertical plane; wherein the second base assembly may comprise: a second support frame substantially triangular in shape and having a first vertex near a proximal end and second and third vertices near a distal end, the second support frame having at least one side disposed along the horizontal plane; and a second cantilever arm comprising a second base portion and a second cantilever portion, the second base portion being coupled to the distal end of the second support frame and the second cantilever portion projecting vertically downwardly and having a second projecting end being orthogonal to the horizontal plane, such that the second projecting end may be disposed along the vertical plane; a tensioner comprising: a first hydraulic arm having a lower end pivotally coupled near the first vertex of the first support frame and in an angular relationship with the horizontal plane; a second hydraulic arm having a lower end pivotally coupled near the first vertex of the second support frame and in an angular relationship with the horizontal plane; and a linear crossmember having opposing ends attached to upper ends of the first and second hydraulic arms; wherein the first and second hydraulic arms are disposed in parallel between the first and second support frames; and a cable having first and second ends coupled near opposing ends of the linear crossmember. The in-situ bollard tester may further comprise a pair of jacks coupled near the proximal ends of the first and second support frames. The tensioner may further comprise first and second rails, respectively; wherein first end portions of the first and second rails may be attached beneath the first and second hydraulic arms and may extend therefrom, respectively; and wherein the linear crossmember may be in a sliding relationship with the first and second rails, such that the first and second rails may be adapted to guide the linear crossmember. The tensioner may further comprise first and second auxiliary arms; wherein the first auxiliary arm may have a first end pivotally coupled to a midportion of the first rail and a second end pivotally coupled near the second vertex of the first support frame; and wherein the second auxiliary arm may have a first end pivotally coupled to a midportion of the second rail and a second end pivotally coupled near the second vertex of the second support frame. The linear crossmember may further comprise a plurality of mounting holes disposed along therewith; wherein the in-situ bollard tester may further comprise a pair of shackles adapted to couple to the plurality of mounting holes via a pair of lock pins, each of the pair of shackles having a load pin sensor adapted for measuring a cable tension; and wherein the opposing ends of the cables may be coupled to the pair of shackles, such that the load pin sensors may be adapted to measure the cable tension of the cable. The in-situ bollard tester may further comprise: a first tension rod having opposing ends coupled near proximal ends of the first and second support frames; and a second tension rod having opposing ends coupled near distal ends of the first and second support frames.

It is an object to provide an apparatus for testing a bollard on site and is safer, accurate, reusable, and inexpensive.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are illustrative embodiments. They do not illustrate all embodiments. They do not set forth all embodiments. Other embodiments may be used in addition or instead. Details, which may be apparent or unnecessary, may be omitted to save space or for more effective illustration. Some embodiments may be practiced with additional components or steps and/or without all of the components or steps, which are illustrated. When the same numeral appears in different drawings, it is intended to refer to the same or like components or steps.

FIG. 7 is an illustration of a rear view thereof.

FIG. 8 is an illustration of a side view of the second embodiment of the in-situ bollard tester and shows the in-situ bollard tester mounted on a pier.

FIG. 20 is an illustration of a front perspective view of a fifth embodiment of an in-situ bollard tester.

FIG. 21 is an illustration of a side elevation view thereof and shows how the jacks are adjustable.

DETAILED DESCRIPTION OF ILLUSTRATIVE EMBODIMENTS

Figure 1:
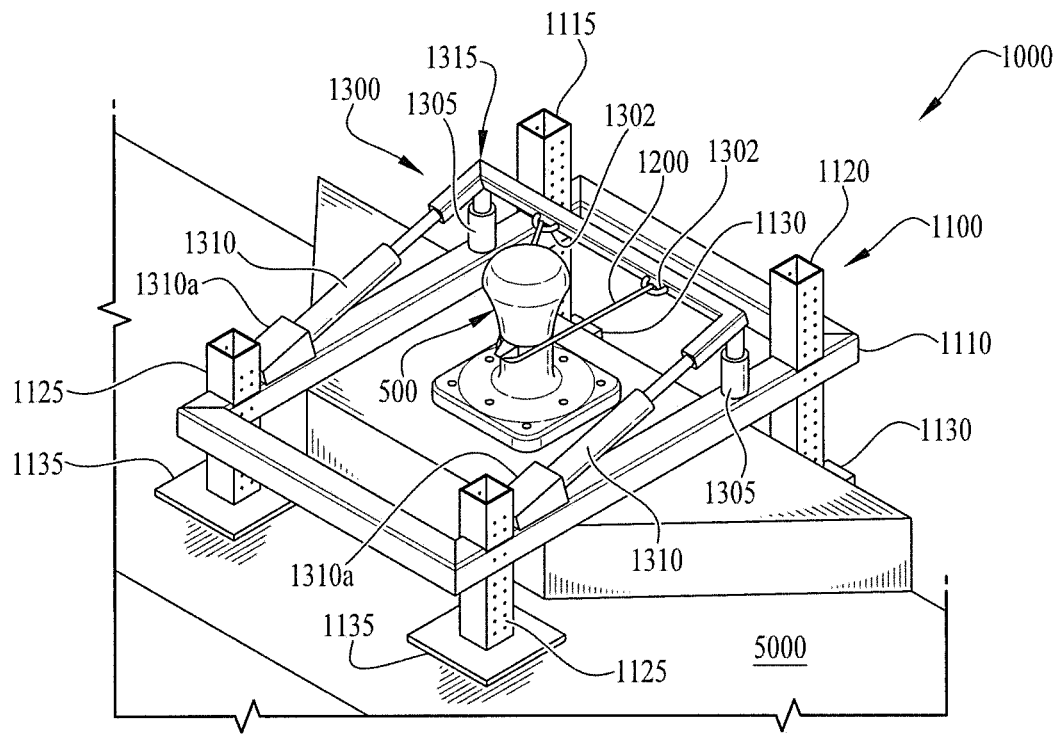
FIG. 1 is an illustration of a front perspective view of a first embodiment of an in-sitt bollard tester.

In the following detailed description, numerous specific details are set forth in order to provide a thorough understanding of various aspects of one or more embodiments of the in-situ bollard tester. However, these embodiments may be practiced without some or all of these specific details. In other instances, well-known methods, procedures, and/or components have not been described in detail so as not to unnecessarily obscure the aspects of these embodiments.

Before the embodiments are disclosed and described, it is to be understood that these embodiments are not limited to the particular structures, process steps, or materials disclosed herein, but is extended to equivalents thereof as would be recognized by those ordinarily skilled in the relevant arts. It should also be understood that the terminology used herein is used for the purpose of describing particular embodiments only and is not intended to be limiting.

Reference throughout this specification to "one embodiment," "an embodiment," or "another embodiment" may refer to a particular feature, structure, or characteristic described in connection with the embodiment of the present disclosure. Thus, appearances of the phrases "in one embodiment" or "in an embodiment" in various places throughout this specification may not necessarily refer to the same embodiment.

Furthermore, the described features, structures, or characteristics may be combined in any suitable manner in various embodiments. In the following description, numerous specific details are provided, such as examples of materials, fasteners, sizes, lengths, widths, shapes, etc. . . . to provide a thorough understanding of the embodiments. One skilled in the relevant art will recognize, however, that the scope of protection can be practiced without one or more of the specific details, or with other methods, components, materials, etc. . . . In other instances, well-known structures, materials, or operations are generally not shown or described in detail to avoid obscuring aspects of the disclosure.

Definitions

In the following description, certain terminology is used to describe certain features of the embodiments of the in-situ bollard tester. For example, as used herein, unless otherwise specified, the term "substantially" refers to the complete, or nearly complete, extent or degree of an action, characteristic, property, state, structure, item, or result. As an arbitrary example, an object that is "substantially" surrounded would mean that the object is either completely surrounded or nearly completely surrounded. The exact allowable degree of deviation from absolute completeness may in some cases depend on the specific context. However, generally speaking, the nearness of completion will be so as to have the same overall result as if absolute and total completion were obtained.

The use of "substantially" is equally applicable when used in a negative connotation to refer to the complete or near complete lack of an action, characteristic, property, state, structure, item, or result. As another arbitrary example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "approximately" may refer to a range of values of ±10% of a specific value.

As used herein, the term "near" refers to a region within close proximity of an intended point, position, or target. The term "near" may also refer to being at the intended point, position, or target. In various embodiments, near may refer to within four feet of an intended point. For example, a leg coupled near a proximal corner of a rectangular frame is located within four feet of the rectangular frame's proximal corner or at the rectangular frame's proximal corner.

As used herein the term "somewhat" refers to a range of values of 50% of a specific value.

As used herein, the term "about" is used to provide flexibility to a numerical range endpoint by providing that a given value may be "a little above" or "a little below" the endpoint. In some cases, the term "about" is to include a range of not more than about two inches of deviation.

By way of illustration, a numerical range of "about 1 inch to about 5 inches" should be interpreted to include not only the explicitly recited values of about 1 inch to about 5 inches, but also include individual values and sub-ranges within the indicated range. Thus, included in this numerical range are individual values such as 2, 3, and 4 and sub-ranges such as from 1-3, from 2-4, and from 3-5.

This same principle applies to ranges reciting only one numerical value and should apply regardless of the breadth of the range or the characteristics being described.

Distances, forces, weights, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

This same principle applies to ranges reciting only one numerical value and should apply regardless of the breadth of the range or the characteristics being described.

As used herein in this disclosure, the singular forms "a" and "the" may include plural referents, unless the context clearly dictates otherwise.

The present disclosure relates generally to on site testing of bollards. In general, a need exists to safely determine the load capacity of existing mooring fittings (i.e., bollards and cleats) on piers and wharves, especially for older or damaged piers. In particular, if a bollard is degraded, a mooring line of a ship may break the bollard, causing damage to the ship or pier and creating a dangerous situation. In-situ tests are generally the preferred method to determine whether bollards are performing at their design capacity, but no standard test or equipment exists. While past bollard tests have used tugboats, these tests are usually dangerous and do not create vertical mooring line angles that create uplift forces against the bollards. Furthermore, other prior bollard tests are typically single-use and only test in the horizontal direction.

Embodiments of the in-situ bollard tester disclosed herein solve this problem by utilizing a cable fastened to the bollard under test and pulling the cable at various load angles. The cable may operably couple to a tensioner such as a hydraulic arm or winch, and the tensioner may be coupled to a frame adapted to mount onto the edge of a pier or wharf. Once the frame is mounted and installed around a bollard, the cable may fasten around the bollard, and the tensioner may pull the cable to safely determine the integrity of the bollard. Load pins via shackles may also be used to measure the cable tension of the cable. The in-situ bollard tester is preferably reusable and safer to use than conventional bollard testers.

In the accompany drawings, like reference numbers indicate like elements. Reference characters 1000, 200, 3000, 4000 depict multiple embodiments of the in-situ bollard tester.

FIG. 1 is an illustration of a front perspective view of a first embodiment of an in-situ bollard tester 1000. As shown in FIG. 1, a first embodiment of the in-situ bollard tester 1000 may comprise a frame 1100, cable 1200, and tensioner 1300. The frame 1100 may be a rigid structure configured to mount onto an edge of a pier 5000 or wharf while surrounding a bollard 500 under test. The frame 1100 may comprise a rectangular frame 1110, hanging columns 1115, 1120, legs 1125, 1130, and base plates 1135. The rectangular frame 1110 may be four or more beams forming a rectangular structure and disposed in a horizontal manner. The hanging columns 1115, 1120 are preferably vertical beams coupled or attached near the distal end corners of the rectangular frame 1110 and are preferably parallel to each other. The hanging columns 1115, 1120 are also preferably orthogonal with respect to the rectangular frame 1110, such that the hanging columns 1115, 1120 are preferably disposed upright to provide lateral support along an edge of the pier 5000. Preferably, the upper ends or upper portions of the hanging columns 1115, 1120 are coupled or attached near the distal end corners of the rectangular frame 1110.

The legs 1125, 1130 are preferably upright structures designed to provide support to the rectangular frame 1110 and hanging columns 1115, 1120 along the edge of the pier 5000. Specifically, a first pair of legs 1125 may be located near the proximal end corners of the rectangular frame 1110 and may provide vertical support to the rectangular frame 1110 above ground. A second pair of legs 1130 may be located near the lower ends of the hanging columns 1115, 1120 to provide lateral support against the sidewalls of the pier 5000. Like the hanging columns 1115, 1120, the first pair of legs 1125 are preferably disposed in parallel to each other and are preferably orthogonal with respect to the rectangular frame 1110. In this manner, the second pair of legs 1130 may be orthogonal to the hanging columns 1115, 1120 and may provide lateral support to the frame 1100. Each leg 1125, 1130 may include base plates 1135 to provide sufficient strength and surface area for contact along the ground and sidewall of the pier 5000.

Various embodiments of the frame 1100, including the rectangular frame 1110, hanging columns 1115, 1120, legs 1125, 1130, and base plates 1135, are preferably constructed of high strength materials such as metal or steel. However, other high strength materials such as composite materials may also be implemented.

The cable 1200 is preferably a steel wire rope or synthetic line used for coupling the bollard 500 to the in-situ bollard tester 1000 for testing the mooring capabilities of the bollard 500. Preferably, the cable 1200 is adapted to withstand high loads of tensioning, and at least a portion of the cable 1200 is preferably fastened against the bollard 500. The opposing ends of the cable 1200 may also be coupled to the tensioner 1300 via shackles 1302.

Various embodiments of the cable 1200 may include, without limitation, ropes, cords, belts, and straps. Where the cable 1200 may be a rope, the rope may be braided in various ways such as a solid braid, diamond braid with no core, and diamond braid with a core. Various rope materials may also be used such as natural fibers (e.g., cotton, linen, silk, hemp, manila, jute, and sisal), synthetic fibers (e.g., nylon, polyester), or metallic wire rope. Proprietary synthetic materials may also be used such as Kevlar® and Spectra®.

The tensioner 1300 may be one or more components configured to apply a force in order to create and maintain tension of the cable 1200. In the embodiment shown in FIG. 1, the tensioner 1300 preferably comprises a pair of posts 1305, pair of hydraulic arms 1310, and a linear crossmember 1315. Opposing ends of the cable 1200 may operably couple to the linear cross member 1315, which may be attached to the upper ends of both hydraulic arms 1310. The lower ends of the hydraulic arms 1310 may removably couple near the proximal end of the rectangular fame 1110, whereas the lower ends of the posts 1305 may removably attach near a distal end of the rectangular frame 1110. A pair of shackles 1302 on the linear crossmember 1315 may be used to fasten or anchor the opposing ends of the cable 1200, and each shackle 1302 may comprise a loading pin 1303 (shown in FIG. 10) for measuring the tension or force on the cable 1200.

Importantly, the hydraulic arms 1310 are preferably in an angular relationship with the rectangular frame 1110, such that the upper ends of the hydraulic arms 1310 or linear crossmember 1315 may contact the upper ends of the posts 1305. The linear crossmember 1315 is also preferably in a sliding relationship with the upper ends of the posts 1305. In this manner, the posts 1305 may provide vertical support to the hydraulic arms 1310, as the hydraulic arms 1310 drive the linear crossmember 1315 forward or rearward, via sliding on the upper ends of the posts 1305. The upper ends of the posts 1305 may also comprise bearings to assist in the sliding action of the linear crossmember 1315.

Additionally, the slope or loading angle of the hydraulic arms 1310 may be adjustable. Specifically, the height of the posts 1305 may be adjusted by installing different posts 1305, having variations in height. Various lower portions 1310a of the hydraulic arms 1310 (each having different slopes or angles) may also be installed to match with the height of the posts 1305. In this regard, when driving the linear crossmember 1315 across the posts 1305, the hydraulic arms 1310 may cooperate with the posts 1305 at various load angles.

In operation, opposing ends of the cable 1200 may couple to the linear crossmember 1315 via shackles 1302. While the cable 1200 is coupled to the linear crossmember 1315, the cable 1200 is preferably wrapped or fastened around the bollard 500. Thus, as the hydraulic arms 1310 drive the linear cross member 1315 towards the distal end of the frame 1100 and away from the bollard 500, force is applied to the cable 1200, creating and increasing cable tension. As tension of the cable 1200 increases, the loading pins 1303 located on the shackles 1302 may measure the cable tension. The operator may also visually inspect the bollard 500 during testing.

Figure 2:
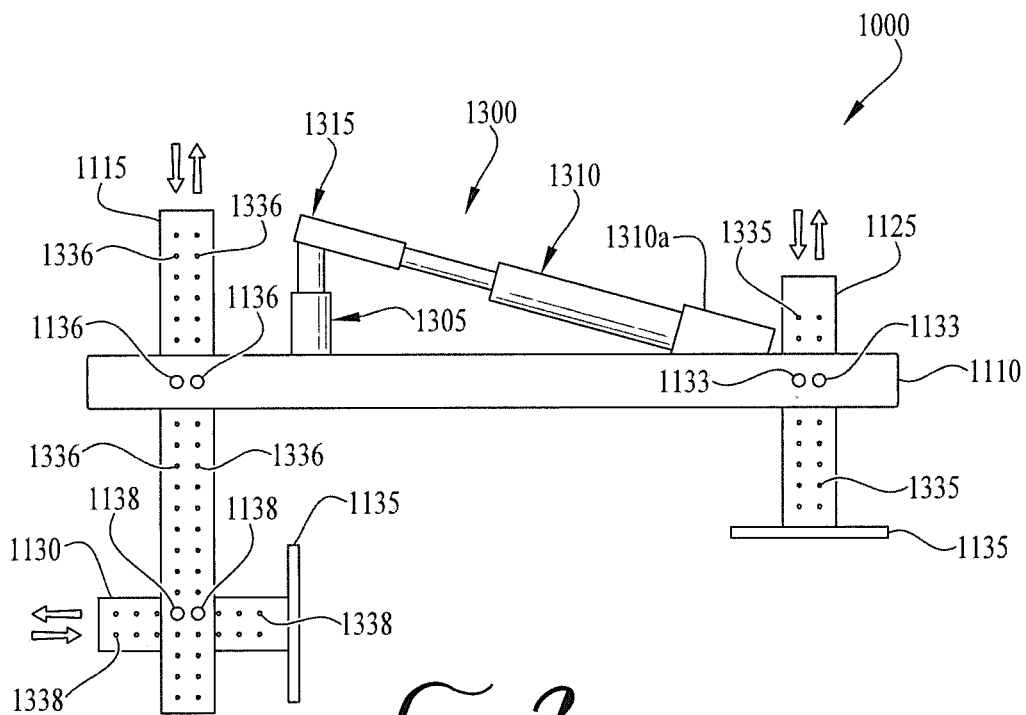
FIG. 2 is an illustration of a side view thereof and shows how the position of the legs and hanging columns are adjustable.

FIG. 2 is an illustration of a side view of the first embodiment of the in-situ bollard tester 1000 and shows how the position of the legs 1125, 1130 and hanging columns 1115, 1120 are adjustable. As shown in FIG. 2, a first embodiment of the in-situ bollard tester 1000 may comprise a frame 1100 and tensioning mechanism 1300. As discussed above, the frame 1100 may comprise a rectangular frame 1110, hanging column 1115, legs 1125, 1130, and base plates 1135.

In this embodiment, the in-situ bollard tester 1000 may comprise one or more pairs of lock pins 1133 and mounting holes 1235 (shown in FIG. 3) located near the proximal corners of the rectangular frame 1110. Additionally, each leg 1125 may moveably couple to the rectangular frame 1110 and may comprise holes 1335 that are evenly spaced and adapted to mate or engage with the lock pins 1133. In this manner, the vertical position of the legs 1125 may lock and secure to the rectangular frame 1110, such that the frame 1100 may be adjustable in height.

Similarly, the in-situ bollard tester 1000 may also further comprise lock pins 1136 and mounting holes 1236 (shown in FIG. 3) located near distal corners of the rectangular frame 1110. Each hanging column 1115, 1120 may moveably couple to the rectangular frame 1110 and may comprise holes 1336 that are evenly spaced and adapted to mate or engage with the lock pins 1136. In this manner, the vertical position of the hanging columns 1115, 1120 may lock and secure to the rectangular frame 1110, such that the frame 1100 may be adjustable in height.

Furthermore, the legs 1130 may comprise lock pins 1138 and holes 1338 located along the length of the legs 1130. Each leg 1130 may be moveably coupled to the hanging columns 1115, 1120, and the holes 1338 may be evenly spaced. The holes 1338 may also mate or engage with the lock pins 1138 via holes 1336 in order to securely lock the legs 1130 to the hanging columns 1115, 1120. In this manner, the vertical or lateral position of the legs 1130 may be adjusted.

Figure 3:
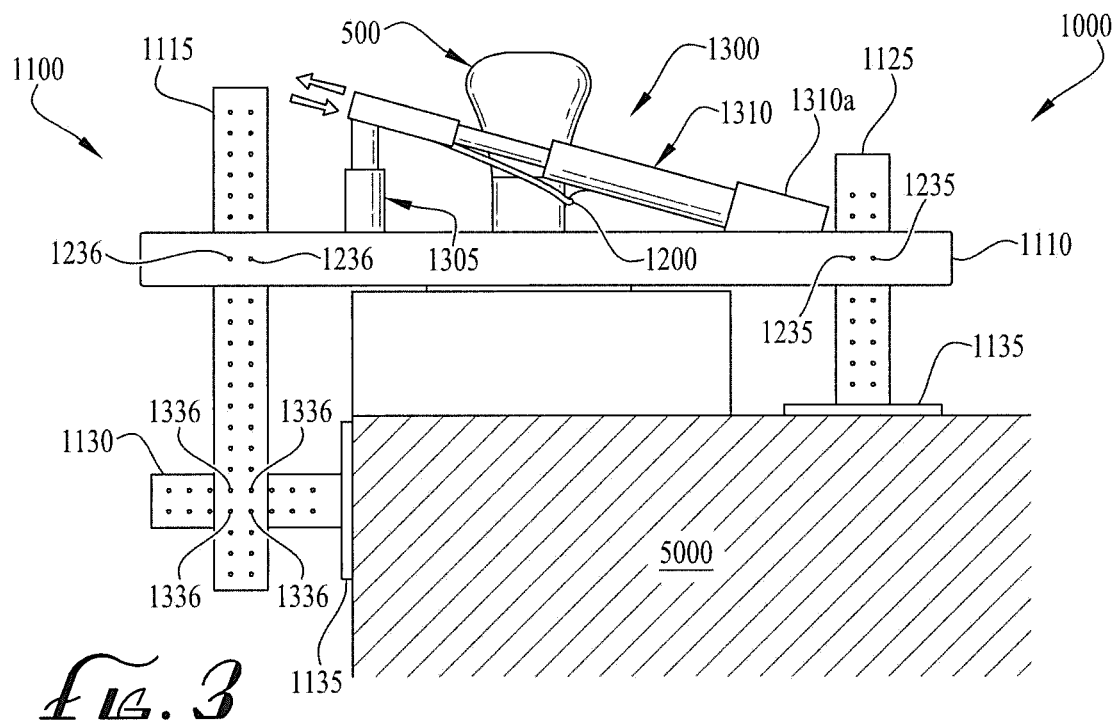
FIG. 3 is an illustration of a side view of the first embodiment of the in-situ bollard tester and shows the in-situ bollard tester mounted on a pier.

FIG. 3 is an illustration of a side view of the first embodiment of the in-situ bollard tester 1000 and shows the in-situ bollard tester 1000 mounted on a pier 5000. As shown in FIG. 3, a first embodiment of the in-situ bollard tester 1000 may comprise a frame 1100, cable 1200, and tensioner 1300. In order to help better illustrate the mounting holes 1236, 1235 and holes 1336, FIG. 3 shows the in-situ bollard tester 1000 without the lock pins 1133, 1136, 1138.

Importantly, FIG. 3 shows that the legs 1125 may be adjusted in height, such that the tensioner 1300 is preferably about the same elevation as the bollard 500. In particular, the rectangular frame 1110 is preferably adjusted to a height right below the bollard 500 while the tensioner 1300 may be adjusted at an elevation about the same height as the bollard 500. In this regard, the hydraulic arms 1310 may slope at an angle with the lower ends of the hydraulic arms 1310 about the same height as the lower end of the bollard 500 and the upper ends of the hydraulic arms 1310 about the same height as the top of the bollard 500. The second pair of legs 1130 is also preferably adjusted at a length, such that the rectangular frame 1110 remains substantially at a horizontal level that is parallel with the ground.

Importantly, FIG. 3 shows how the in-situ bollard tester 1000 tests the integrity of the bollard 500. Here, the hydraulic arms 1310 of the tensioner 1300 preferably drives the linear crossmember 1315 towards the distal end of the frame 1100. This may cause the center portion of the cable 1200 to push against the bollard 500. The angular relation between the hydraulic arms 1310 and the rectangular frame 1100 may also allow the in-situ bollard tester 1000 to apply an upward force or angular load, which may help determine the integrity of the bollard 500. As the linear crossmember 1315 moves away from the bollard 500, tension of the cable 1200 increases and may be measured by the loading pins 1303. The operator may also visually inspect the bollard 500 during testing. The position of the legs 1125, 1130 and angular orientation of the hydraulic arms 1310 may be adjusted to accommodate various load angles used against the bollard 500.

Figure 4:
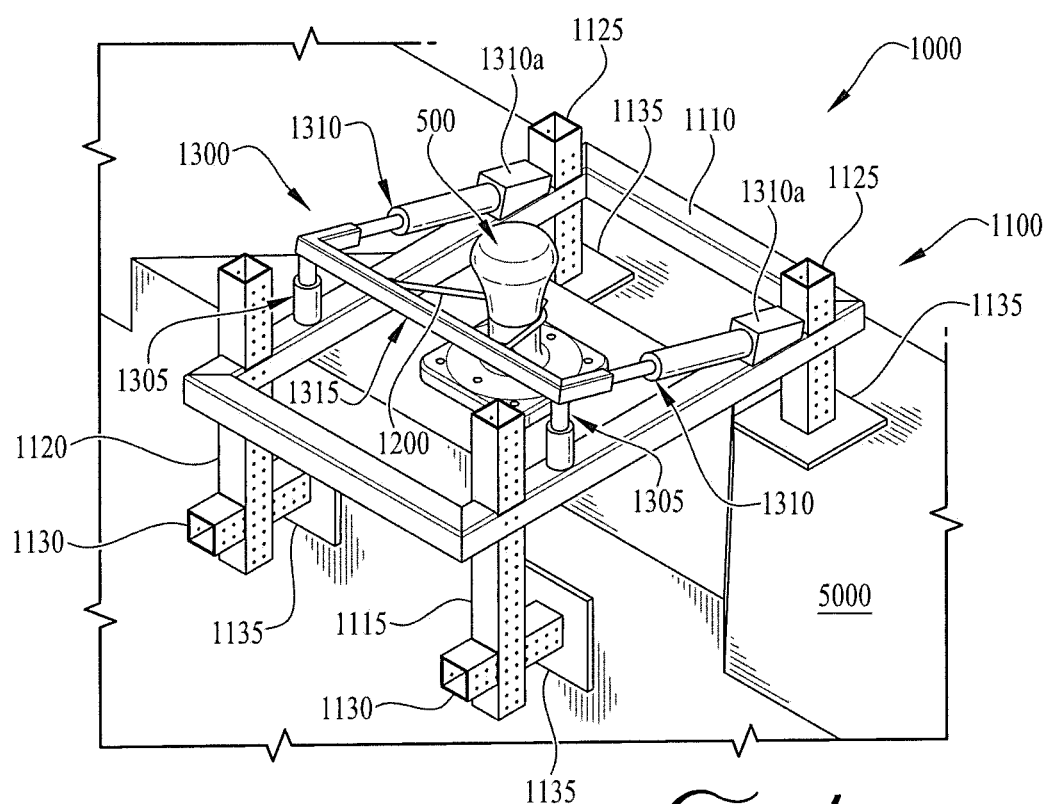
FIG. 4 is an illustration of a rear perspective view thereof.

FIG. 4 is an illustration of arear perspective view of the first embodiment of the in-situ bollard tester 1000. As shown in FIG. 4, a first embodiment of the in-situ bollard tester 1000 may comprise a frame 1100, cable 1200, and tensioner

1300. Here, FIG. 4 shows the frame 1100 surrounding the bollard 500 and the cable 1200 fastening against the bollard 500.

Figure 5:
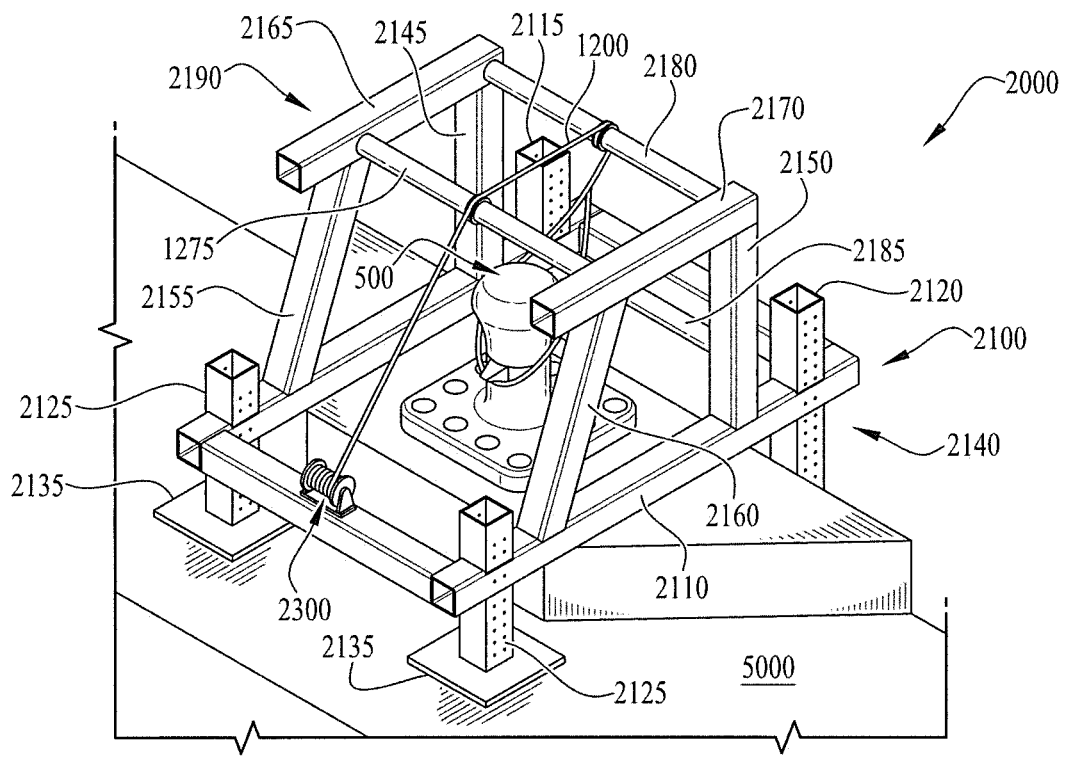
FIG. 5 is an illustration of a front perspective view of a second embodiment of the in-situ bollard tester.

FIG. 5 is an illustration of a front perspective view of a second embodiment of the in-situ bollard tester 2000. As shown in FIG. 5, a second embodiment of the in-situ bollard tester 2000 may comprise a frame 2100, cable 1200, and tensioner 2300. Like the previous embodiment, the frame 2100 may be a rigid structure configured to mount around a bollard 500 and onto an edge of a pier 5000 or wharf. The frame 2100 may have an upper frame portion 2190 and a lower frame portion 2140, wherein the lower frame portion 2140 may comprise a rectangular frame 2110, hanging columns 2115, 2120, legs 2125, 2130, and base plates 2135. The rectangular fame 2110 may be four or more beams forming a rectangular structure and disposed in a horizontal manner. The hanging columns 2115, 2120 may couple or attach near the distal end corners of the rectangular frame 2110 and may be parallel to each other. The hanging columns 2115, 2120 are also preferably oriented in an orthogonal manner with respect to the rectangular frame 2110, such that the hanging columns 2115, 2120 may be upright to provide lateral support along an edge of a pier 5000. Preferably, the upper ends or upper portions of the hanging columns 2115, 2120 are coupled or attached near the distal end corners of the rectangular frame 2110.

Importantly, unlike the previous embodiment of the frame 1100 shown in FIGS. 1-4, another embodiment of the frame 2100 may include an upper frame portion 2190, comprising: a pair of posts 2145, 2150, pair of struts 2155, 2160, pair of beams 2165, 2170, and linear crossmembers 2175, 2180, 2185. The lower ends of the posts 2145, 2150 are preferably attached near the distal end of the rectangular frame 2110, and the lower ends of the struts 2155, 2160 are preferably attached near the proximal end of the rectangular frame 2110. The struts 2155, 2160, which are preferably in an angular relationship with the rectangular frame 2110, may be physically coupled to posts 2145, 2150 via beams 2165, 2170, such that posts 2145, 2150, struts 2155, 2160, and beams 2165, 2170 may form a pair of trusses. In particular, the pair of beams 2165, 2170 are preferably disposed in parallel to each other and are attached to the upper ends of the struts 2155, 2160 and posts 2145, 2150. The first linear crossmember 2180 preferably extends between upper ends of the posts 2145, 2150 while the second linear crossmember 2175 preferably extends between the upper ends of the struts 2155, 2160. The third linear crossmember 2185 may extend between posts 2155, 2160 and below the first linear crossmember 2180.

Like the previous embodiment, the legs 2125, 2130 are preferably upright structures that provide support to the frame 2100 along the edge of the pier 5000. The base plates 2135 preferably serve as a contact surface for the ground and sidewall of a pier 5000 and provide sufficient strength and sturdiness. Specifically, the first pair of legs 2125 may provide vertical support to the rectangular frame 2110, whereas the second pair of legs 2130 may provide lateral support to the hanging columns 2115, 2120 against the sidewalls of the pier 5000. Like the first pair of legs 1125 in the previous embodiment, legs 2125 are preferably disposed in parallel with one another and are coupled in an orthogonal manner with respect to the rectangular frame 2110. The first pair of legs 2125 may also couple near proximal end corners of the rectangular frame 2110. The second pair of legs 2130, on the other hand, may couple near the lower ends of the hanging columns 2115, 2120 and may be disposed in parallel with each other. These legs 2130 are also preferably disposed in an orthogonal manner with respect to the hanging columns 2115, 2120, such that the legs 2130 may provide lateral support to the frame 2100.

As discussed above, the cable 1200 may be a thick rope of wire, metal wire rope, or synthetic line used for coupling the bollard 500 to the in-situ bollard tester 2000 and testing the mooring capabilities of the bollard 500. The cable 1200 is preferably adapted to withstand high loads of tensioning, and the first end of the cable 1200 is preferably adapted to fasten onto the bollard 500 (e.g., lasso). The opposing end of the cable 1200 is preferably coupled to the tensioner 2300 in order to pull the cable 1200 and create and maintain cable tension to the cable 1200.

In various embodiments, the cable 1200 may be a rope, cord, cable, or strap. For rope embodiments, the cable 1200 may be braided in various ways, and a variety of rope materials may be used such as cotton, linen, silk, hemp, manila, jute, and steel. Synthetic fibers may also be used such as nylon and polyester, as well as a number of proprietary materials such as Kevlar® and Spectra®.

Like the previous embodiment, the tensioner 2300 may be a device that applies a force to create or maintain tension. FIG. 5 shows that an embodiment of the tensioner 2300 may be a winch centrally disposed at the proximate end of the in-situ bollard tester 2000. On a first end, the cable 1200 may operably couple to the tensioner 2300 or winch, whereas the opposing end of the cable 1200 may fasten to the bollard 500. Portions of the cable 1200 may also extend around one or more of the linear crossmembers 2175, 2180, 2185, as shown in FIG. 5. In this manner, the tensioner 2300 and linear crossmembers 2175, 2180, 2185 may provide tension to the cable 1200 and apply forces to the bollard 500 at various loading angles.

Figure 6:
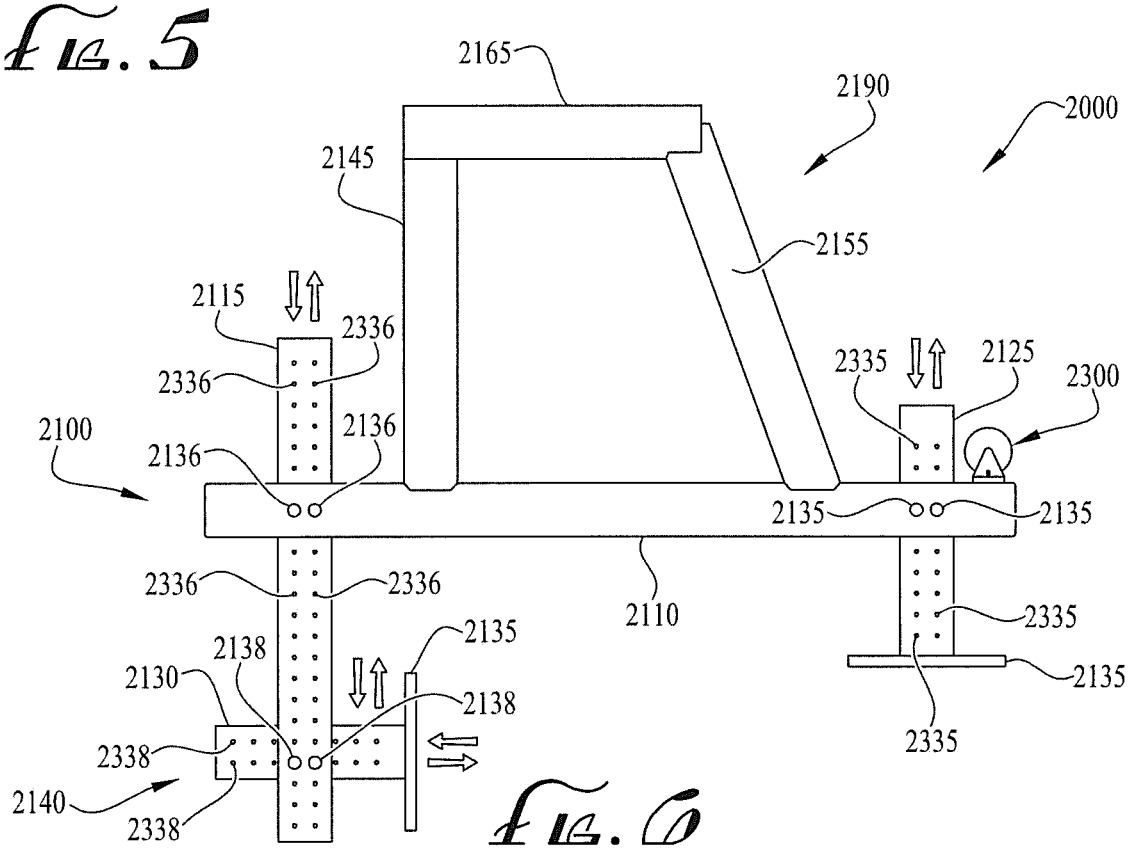
FIG. 6 is an illustration of a side view thereof and shows how the position of the legs and hanging columns are adjustable.

FIG. 6 is an illustration of a side view of the second embodiment of the in-situ bollard tester 2000 and shows how the position of the legs 2125, 2130 and hanging columns 2115, 2120 are adjustable. As shown in FIG. 6, a second embodiment of the in-situ bollard tester 2000 may comprise a frame 2100 having upper frame portion 2190 and a lower frame portion 2140. The upper frame portion 2190 may comprise a post 2150, strut 2155, and beam 2165. The lower frame portion 2140 may comprise a rectangular frame 2110, hanging column 2115, legs 2125, 2130, and base plates 2135.

In this embodiment, the in-situ bollard tester 2000 may comprise one or more pairs of lock pins 2135 and mounting holes 2235 (shown in FIG. 8) located near the proximal end corners of the rectangular frame 2110. Additionally, each leg 2125 may moveably couple to the rectangular frame 2110 and may comprise holes 2335 that are evenly spaced and adapted to mate or engage with the lock pins 2135. In this manner, the vertical position of the legs 2125 may look and secure to the rectangular frame 2110, such that the height of the frame 2100, when mounted on the pier 5000, may be adjustable.

Similarly, the in-situ bollard tester 2000 may also further comprise lock pins 2136 and mounting holes 2236 (shown in FIG. 8) located near distal end corners of the rectangular frame 2110. Each hanging column 2115, 2120 may moveably couple to the rectangular frame 2110 and may comprise holes 2336 that are evenly spaced and adapted to mate or engage with the lock pins 2136. In this manner, the vertical position of the hanging columns 2115, 2120 may lock and secure to the rectangular frame 2110, such that the frame 2100 may be adjustable in height.

Furthermore, the legs 2130 may comprise lock pins 2138 and holes 2338 located along the length of the legs 2130.

Each leg 2130 may be moveably coupled to the hanging columns 2115, 2120, and the holes 2338 may be evenly spaced. The holes 2338 may also mate or engage with the lock pins 2138 via holes 2336 in order to securely lock the legs 2130 to the hanging columns 2115, 2120. In this manner, the vertical or lateral position of the frame 2100 may be adjusted.

FIG. 7 is an illustration of a rear view of the second embodiment of the in-situ bollard tester 2000. As shown in FIG. 7, a second embodiment of the in-situ bollard tester 2000 may comprise a frame 2100 having an upper frame portion 2190, lower frame portion 2140, and tensioner 2300. FIG. 7 shows the tensioner 2300, which is preferably a winch, may be centrally disposed on the rectangular frame 2100. FIG. 7 also shows that embodiments of the linear crossmembers 2175, 2180, 2185 may comprise sheaves 2180a, 2185a, which may be a grooved wheel or pulley centrally disposed along the linear crossmembers 2175, 2180, 2185. Each of the sheaves 2180a, 2185a may be configured for guiding the cable 1200 and redirecting the cable 1200 directly away from the bollard 500. The sheaves 2180a, 2185a may also allow the cable 1200 to move freely, minimizing friction and wear on the cable 1200.

FIG. 8 is an illustration of a side view of the second embodiment of the in-situ bollard tester 2000 and shows the in-situ bollard tester mounted on a pier 5000. As shown in FIG. 8, a second embodiment of the in-situ bollard tester 2000 may comprise a tensioner 2300, cable 1200, and frame 2100. The frame 2100 may have an upper frame portion 2190 and a lower frame portion 2140, wherein the upper frame portion 2190 may comprise a post 2150, strut 2155, and beam 2170. The lower frame portion 2140 may comprise a rectangular frame 2110, hanging column 2115, legs 2125, 2130, and base plates 2135.

Importantly, FIG. 8 shows how the cable 1200 may be operably coupled to the tensioner 2300 (e.g., winch) and bollard 500. In particular, a first end of the cable 1200 may be operably coupled to a winch, whereas the second end of the cable 1200 may be fastened to the bollard 500. Portions of the cable 1200 may also extend around one or more of the linear crossmembers 2175, 2180, 2185, (shown in FIG. 5). In this manner, the winch and linear crossmembers 2175, 2180, 2185 may provide tension to the cable 1200 and apply forces to the bollard 500 at various loading angles.

Figure 9:
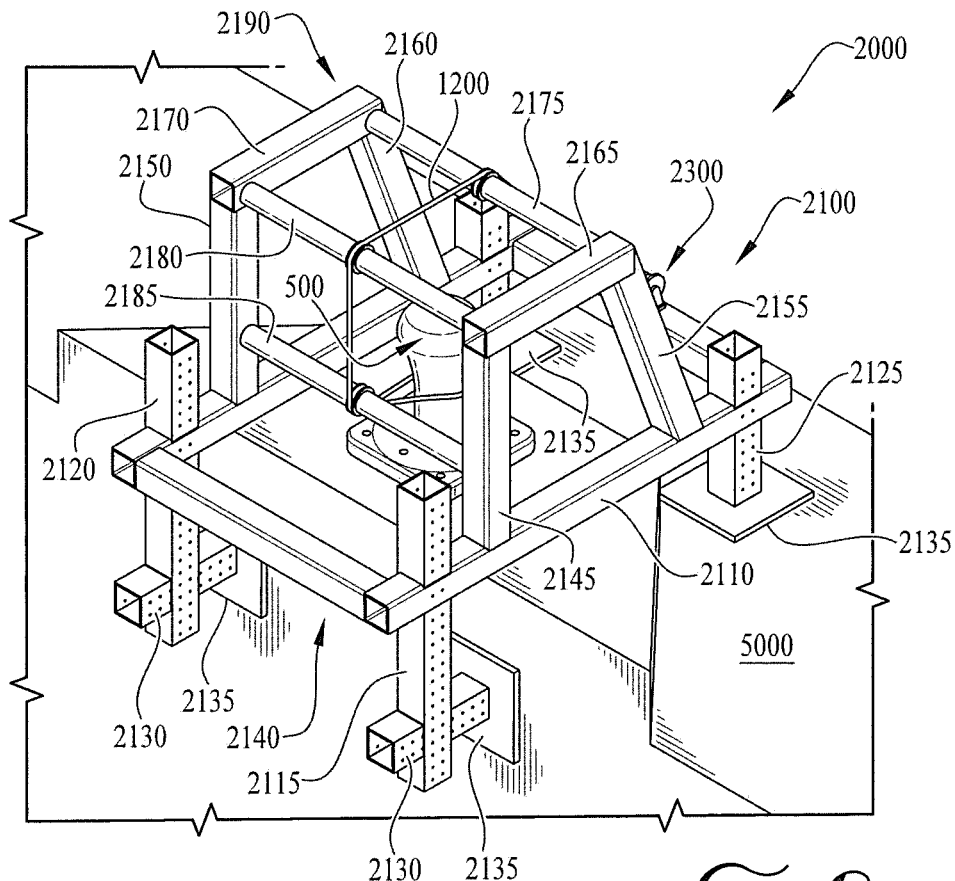
FIG. 9 is an illustration of a rear perspective view thereof.

FIG. 9 is an illustration of a rear perspective view of the second embodiment of the in-situ bollard tester 2000. As shown in FIG. 9, a second embodiment of the in-situ bollard tester 2000 may comprise a tensioner 2300, cable 1200, and frame 2100. The frame 2100 may have an upper frame portion 2190 and a lower frame portion 2140, wherein the upper frame portion 2190 may comprise a posts 2145, 2150, struts 2155, 2160, and beams 2165, 2170. The lower frame portion 2140 may comprise a rectangular frame 2110, hanging columns 2115, 2120, legs 2125, 2130, and base plates 2135. Here, FIG. 9 also shows how the cable 1200 extends around all three linear crossmembers 2175, 2180, 2185 and fastens onto the bollard 500. The tensioner 2300 or winch may pull the cable 1200 and, as a result, may apply tension to the cable 1200, thereby applying force at various load angles against the bollard 500. In this manner, the in-situ bollard tester 2000 may test the integrity of the bollard 500.

Figure 10:
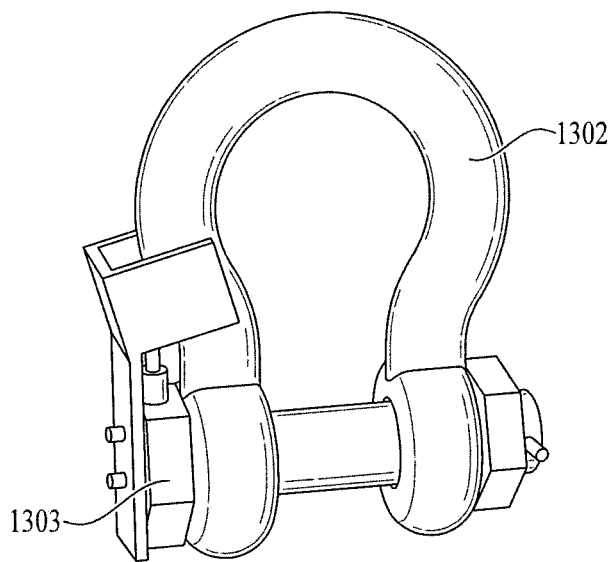
FIG. 10 is an illustration of a shackle with a loading pin.

FIG. 10 is an illustration of one embodiment of a shackle 1302 with a loading pin 1303. As discussed above, the shackle 1302 may be coupled or attached to the linear crossmember 1315 and may be used to fasten or anchor the opposing ends of the cable 1200. The loading pin 1303, which is operably coupled to the shackle 1302 may be used for measuring the tension or force on the cable 1200. The shackle 1303 and loading pin 1303 may both be constructed of high tensile carbon steel construction, and may have a load rating between approximately 1 tonne to 400 tonnes. Together, the shackle 1302 and loading pin 1303 may provide load monitoring of the cable 1200.

Figure 11:
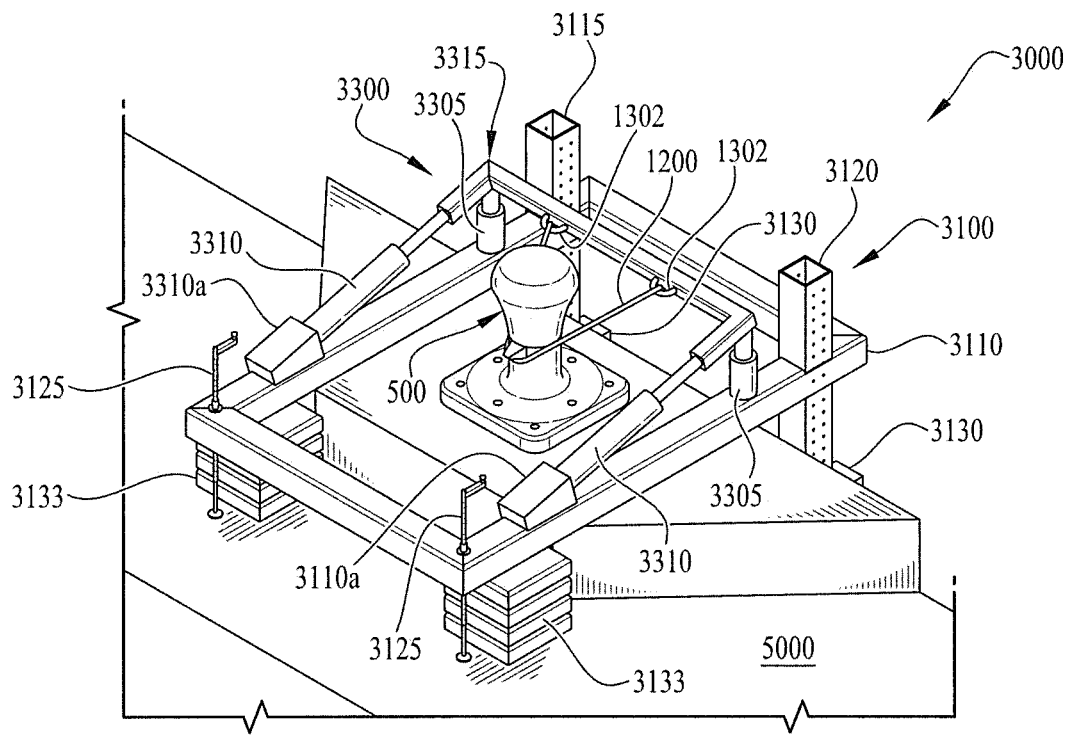
FIG. 11 is an illustration of a front perspective view of a third embodiment of an in-situ bollard tester.

FIG. 11 is an illustration of a front perspective view of a third embodiment of an in-situ bollard tester 3000. As shown in FIG. 11, a third embodiment of the in-situ bollard tester 3000 may comprise a frame 3100, cable 1200, and tensioner 3300. Like the first embodiment of the frame 1000, the frame 3100 may be a rigid structure configured to mount onto an edge of a pier 5000 or wharf while surrounding a bollard 500 under test. The frame 3100 may comprise a rectangular frame 3110, hanging columns 3115, 3120, jacks 3125, legs 3130, and base plates 3135 (shown in FIG. 12). The rectangular frame 3110 may be four or more beams forming a rectangular structure and disposed in a horizontal manner. The hanging columns 3115, 3120 are preferably vertical beams coupled or attached near the distal end corners of the rectangular frame 3110 and are preferably disposed in parallel to each other. The hanging columns 3115, 3120 are also preferably orthogonal with respect to the rectangular frame 3110, such that the hanging columns 3115, 3120 are preferably disposed upright to provide lateral support along an edge of the pier 5000. Preferably, the upper ends or upper portions of the hanging columns 3115, 3120 are coupled or attached near the distal end corners of the rectangular frame 3110.

The legs 3130 are preferably structures designed to provide support to the rectangular frame 3110 and hanging columns 3115, 3120 along the edge of the pier 5000. Specifically, the legs 3130 may be located near the lower ends of the hanging columns 3115, 3120 to provide lateral support against the sidewalls of the pier 5000. The legs 3130 may also be orthogonal to the hanging columns 3115, 3120 and may provide lateral support to the frame 3100. Each leg 3130 may include base plates 3135 to provide sufficient strength and surface area for contact along the sidewall of the pier 5000.

The jacks 3125 are preferably devices configured to provide vertical support to the rectangular frame 3110. Importantly, the jacks 3125 are preferably located near the proximal end corners of the rectangular frame 3110 and preferably configured to lift the rectangular frame 3110. Exemplary embodiments of the jacks 3125 may be level jacks, leveling screw jacks, or jackscrews, which employ a screw thread or lead screw. Thus, by turning the screw thread or leadscrew, the proximal end corners of the rectangular frame 3110 may be raised or lowered.

Like the hanging columns 3115, 3120, the jacks 3125 are preferably disposed in parallel to each other and are preferably orthogonal with respect to the rectangular frame 3110. To provide further vertical support to the rectangular frame 3110, the in-situ bollard tester 3000 may further comprise one or more pairs of dunnages 3133, which are preferably disposed beneath the rectangular frame, near the proximal end corners of the rectangular frame 3110, as shown in FIG. 11.

Various embodiments of the frame 3100, including the rectangular frame 3110, hanging columns 3115, 3120, jacks 3125, legs 3130, base plates 3135, and dunnages 3133 are preferably constructed of high strength materials such as metal or steel. However, other high strength materials such as composite materials may also be implemented.

As mentioned above, the cable 1200 is preferably a steel wire rope or synthetic line used for coupling the bollard 500 to the in-situ bollard tester 3000 for testing the mooring capabilities of the bollard 500. Preferably, the cable 1200 is adapted to withstand high loads of tensioning, and at least a portion of the cable 1200 is preferably fastened against the bollard 500. The opposing ends of the cable 1200 may also be coupled to the tensioner 1300 via shackles 1302.

Various embodiments of the cable 1200 may include, without limitation, ropes, cords, belts, and straps. Where the cable 1200 may be a rope, the rope may be braided in various ways such as a solid braid, diamond braid with no core, and diamond braid with a core. Various rope materials may also be used such as natural fibers (e.g., cotton, linen, silk, hemp, manila, jute, and sisal), synthetic fibers (e.g., nylon, polyester), or metallic wire rope. Proprietary synthetic materials may also be used such as Kevlar® and Spectra®.

The tensioner 3300 may be one or more components configured to apply a force in order to create and maintain tension of the cable 1200. In the embodiment shown in FIG. 11, the tensioner 3300 preferably comprises a pair of posts 3305, pair of hydraulic arms 3310, and a linear crossmember 3315. Opposing ends of the cable 1200 may operably couple to the linear cross member 3315, which may be attached to the upper ends of both hydraulic arms 3310. The lower ends of the hydraulic arms 3310 may removably couple near the proximal end of the rectangular frame 3110, whereas the lower ends of the posts 3305 may removably attach near a distal end of the rectangular frame 3110. A pair of shackles 1302 on the linear crossmember 3315 may be used to fasten or anchor the opposing ends of the cable 1200, and each shackle 1302 may comprise a loading pin 1303 for measuring the tension or force on the cable 1200.

Importantly, the hydraulic arms 3310 are preferably in an angular relationship with the rectangular frame 3110, such that the upper ends of the hydraulic arms 3310 or linear crossmember 3315 may contact the upper ends of the posts 3305. The linear crossmember 3315 is also preferably in a sliding relationship with the upper ends of the posts 3305. In this manner, the posts 3305 may provide vertical support to the hydraulic arms 3310, as the hydraulic arms 3310 drive the linear crossmember 3315 forward or rearward, via sliding on the upper ends of the posts 3305. The upper ends of the posts 3305 may also comprise bearings to assist in the sliding action of the linear crossmember 3315.

Additionally, the slope or loading angle of the hydraulic arms 3310 may be adjustable. Specifically, the height of the posts 3305 may be adjusted by installing different posts 3305, having variations in height. Various lower portions 3310a of the hydraulic arms 3310 (each having different slopes or angles) may also be installed to match with the height of the posts 3305. In this regard, when driving the linear crossmember 3315 across the posts 3305, the hydraulic arms 3310 may cooperate with the posts 3305 at various load angles.

In operation, opposing ends of the cable 1200 may couple to the linear crossmember 3315 via shackles 1302. While the cable 1200 is coupled to the linear crossmember 3315, the cable 1200 is preferably wrapped or fastened around the bollard 500. Thus, as the hydraulic arms 3310 drive the linear cross member 3315 towards the distal end of the frame 3100 and away from the bollard 500, force is applied to the cable 1200, creating and increasing cable tension. As tension of the cable 1200 increases, the loading pins 1303 located on the shackles 1302 may measure the cable tension. The operator may also visually inspect the bollard 500 during testing.

Figure 12:
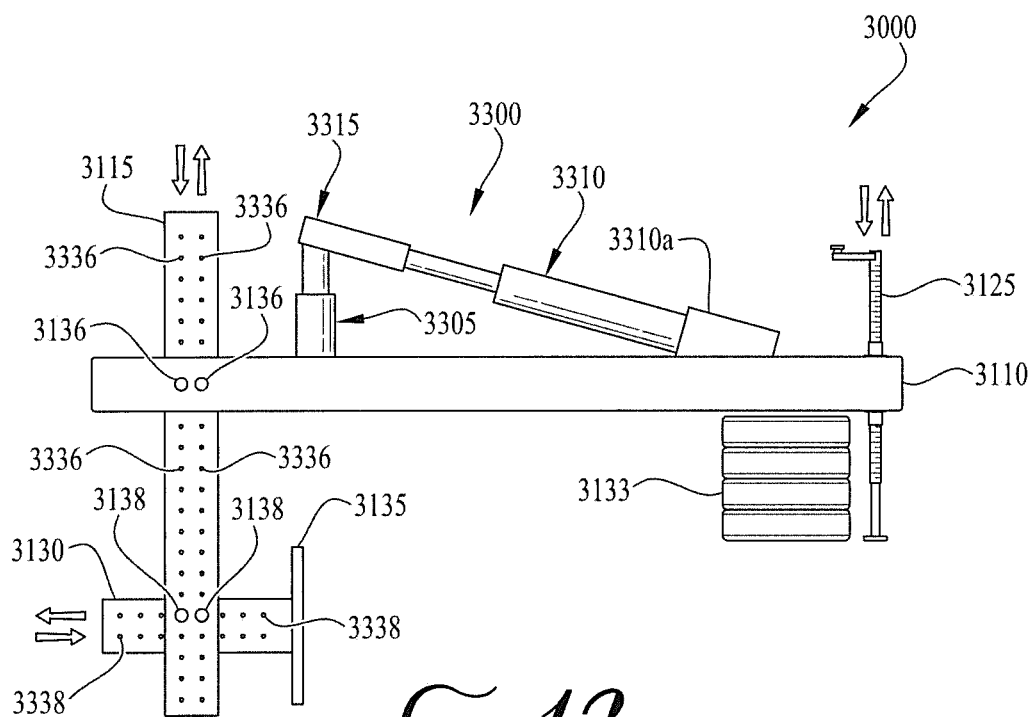
FIG. 12 is an illustration of a side view thereof and shows how the position of the legs, jacks, and hanging columns are adjustable.

FIG. 12 is an illustration of a side view of the third embodiment of the in-situ bollard tester 3000 and shows how the position of the legs 1130, jacks 3125, and hanging columns 1115, 1120 are adjustable. As shown in FIG. 12, a third embodiment of the in-situ bollard tester 3000 may comprise a frame 3100 and tensioning mechanism 3300. As discussed above, the frame 3100 may comprise a rectangular frame 3110, hanging column 3115, jacks 3125, legs 3130, and base plates 3135.

As discussed above, the jacks 3125 may employ a screw thread or lead screw, which by turning the screw thread or leadscrew, may raise or lower the proximal end corners of the rectangular frame 3110. Importantly, the in-situ bollard tester 3000 may also further comprise lock pins 3136 and mounting holes 3236 (shown in FIG. 13) located near distal corners of the rectangular frame 3110. Each hanging column 3115, 3120 may moveably couple to the rectangular frame 3110 and may comprise holes 3336 that are evenly spaced and adapted to mate or engage with the lock pins 3136. In this manner, the vertical position of the hanging columns 3115, 3120 may lock and secure to the rectangular frame 3110, such that the frame 3100 may be adjustable in height.

Furthermore, the legs 3130 may comprise lock pins 3138 and holes 3338 located along the length of the legs 3130. Each leg 3130 may be moveably coupled to the hanging columns 3115, 3120, and the holes 3338 may be evenly spaced. The holes 3338 may also mate or engage with the lock pins 3138 via holes 3336 in order to securely lock the legs 3130 to the hanging columns 3115, 3120. In this manner, the vertical or lateral position of the legs 3130 may be adjusted.

Figure 13:
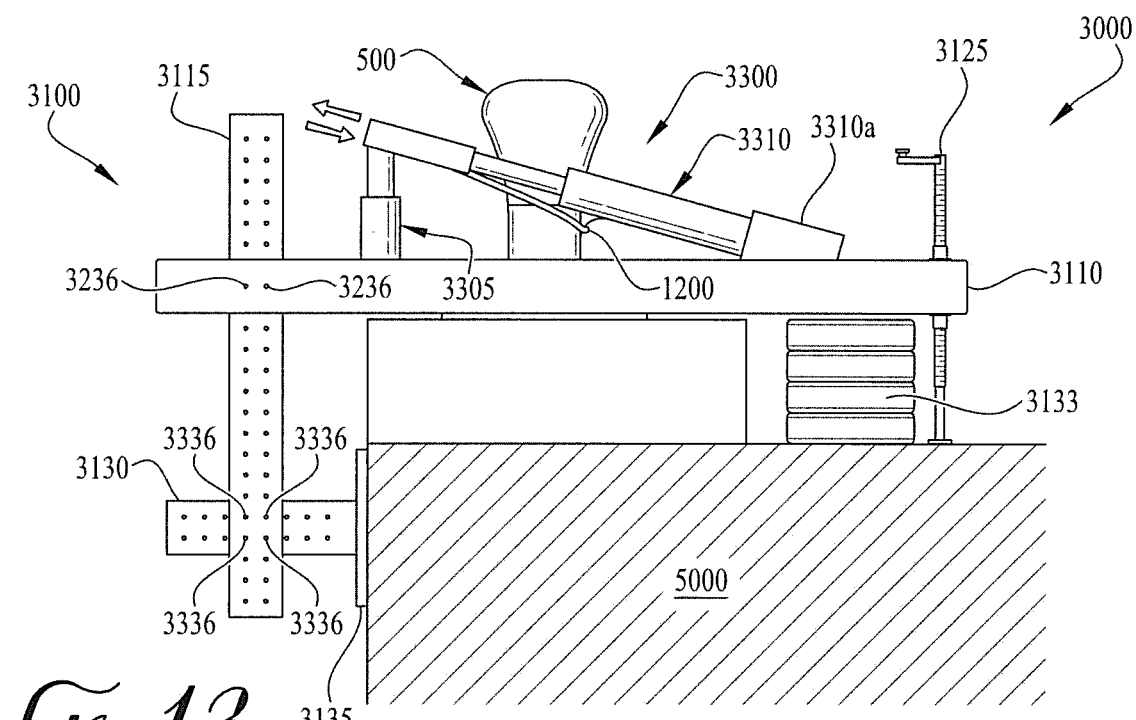
FIG. 13 is an illustration of a side view of the third embodiment of the in-situ bollard tester and shows the in-situ bollard tester mounted on a pier.

FIG. 13 is an illustration of a side view of the third embodiment of the in-situ bollard tester 1000 and shows the in-situ bollard tester 3000 mounted on a pier 5000. As shown in FIG. 3, one embodiment of the in-situ bollard tester 3000 may comprise a frame 3100, cable 1200, and tensioner 3300. Additionally, one or more pairs of dunnages 3133 may be disposed beneath the rectangular frame. The help better illustrate the mounting holes 3236 and holes 3336, FIG. 13 shows the in-situ bollard tester 3000 without the lock pins 3136, 3138.

Importantly, FIG. 13 shows that the jacks 3125 may be adjusted in height, such that the tensioner 3300 is preferably about the same elevation as the bollard 500. In particular, the rectangular frame 3110 is preferably adjusted to a height right below the bollard 500 while the tensioner 3300 may be adjusted at an elevation about the same height as the bollard 500. In this regard, the hydraulic arms 3310 may slope at an angle with the lower ends of the hydraulic arms 3310 about the same height as the lower end of the bollard 500 and the upper ends of the hydraulic arms 3310 about the same height as the top of the bollard 500. The legs 3130 and jacks 3125 are also preferably adjusted at a length and height, respectively, such that the rectangular frame 3110 remains substantially at a horizontal level that is parallel with the ground.

Importantly, FIG. 13 shows how the in-situ bollard tester 3000 tests the integrity of the bollard 500. Here, the hydraulic arms 3310 of the tensioner 3300 preferably drives the linear crossmember 3315 towards the distal end of the frame 3100. This may cause the center portion of the cable 1200 to push against the bollard 500. The angular relation between the hydraulic arms 3310 and the rectangular frame 3100 may also allow the in-situ bollard tester 3000 to apply an upward force or angular load, which may help determine the integrity of the bollard 500. As the linear crossmember 3315 moves away from the bollard 500, tension of the cable 1200 increases and may be measured by the loading pins 1303. The operator may also visually inspect the bollard 500 during testing. The position of the jacks 3125 and legs 3130 and angular orientation of the hydraulic arms 3310 may be adjusted to accommodate various load angles used against the bollard 500.

Figure 14:
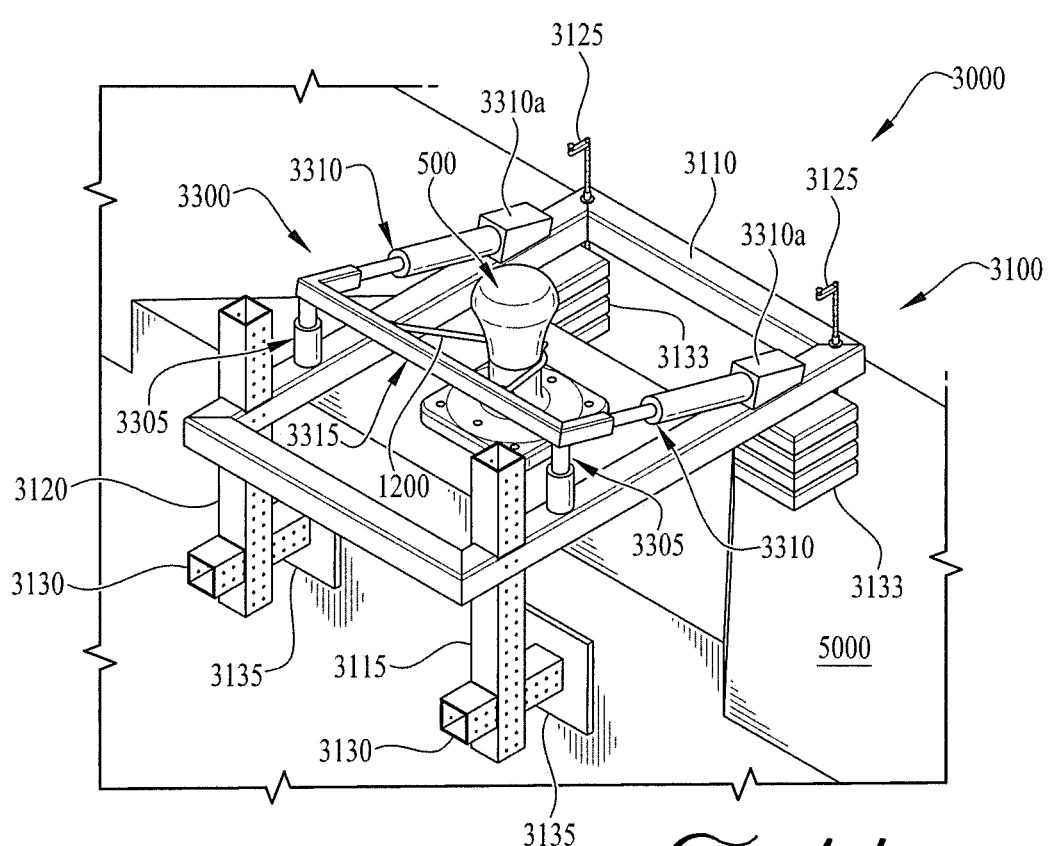
FIG. 14 is an illustration of a rear perspective view thereof.

FIG. 14 is an illustration of a rear perspective view of the third embodiment of the in-situ bollard tester 3000. As shown in FIG. 4, one embodiment of the in-situ bollard tester 3000 may comprise a frame 3100, cable 1200, and tensioner 3300. Here, FIG. 14 shows the frame 3100 surrounding the bollard 500 and the cable 1200 fastening against the bollard 500.

Figure 15:
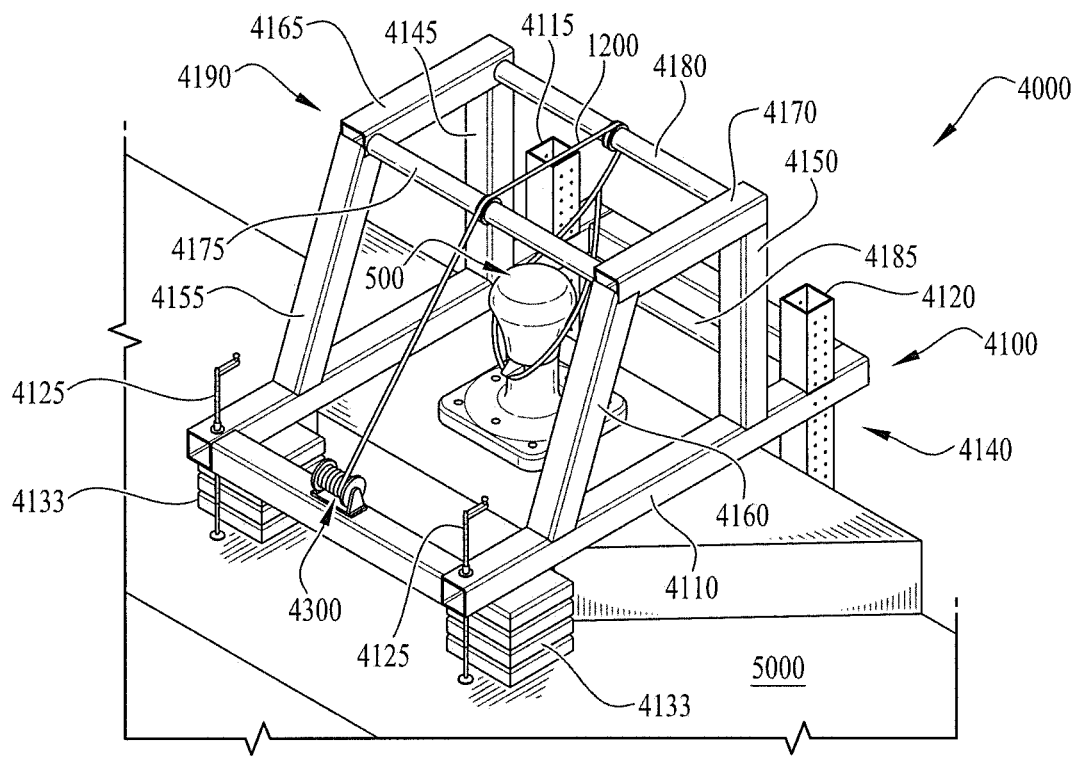
FIG. 15 is an illustration of a front perspective view of a fourth embodiment of the in-situ bollard tester.

FIG. 15 is an illustration of a front perspective view of a fourth embodiment of the in-situ bollard tester 4000. As shown in FIG. 15, a fourth embodiment of the in-situ bollard tester 4000 may comprise a frame 4100, cable 1200, and tensioner 4300. Like the previous embodiments, the frame 4100 may be a rigid structure configured to mount around a bollard 500 and onto an edge of a pier 5000 or wharf. The frame 4100 may have an upper frame portion 4190 and a lower frame portion 4140, wherein the lower frame portion 4140 may comprise a rectangular frame 4110, hanging columns 4115, 4120, jacks 4125, legs 4130, and base plates 4135. The rectangular frame 4110 may be four or more beams forming a rectangular structure and disposed in a horizontal manner. The hanging columns 4115, 4120 may couple or attach near the distal end corners of the rectangular frame 4110 and may be parallel to each other. The hanging columns 4115, 4120 are also preferably oriented in an orthogonal manner with respect to the rectangular frame 4110, such that the hanging columns 4115, 4120 may be upright to provide lateral support along an edge of a pier 5000. Preferably, the upper ends or upper portions of the hanging columns 4115, 4120 are coupled or attached near the distal end corners of the rectangular frame 4110.

Importantly, unlike the previous embodiments of the frame 1100, 2100, 3100, another embodiment of the frame 4100 may include an upper frame portion 4190, comprising: a pair of posts 4145, 4150, pair of struts 4155, 4160, pair of beams 4165, 4170, and linear crossmembers 4175, 4180, 4185. The lower ends of the posts 4145, 4150 are preferably attached near the distal end of the rectangular frame 4110, and the lower ends of the struts 4155, 4160 are preferably attached near the proximal end of the rectangular frame 4110. The struts 4155, 4160, which are preferably in an angular relationship with the rectangular frame 4110, may be physically coupled to posts 4145, 4150 via beams 4165, 4170, such that posts 4145, 4150, struts 4155, 4160, and beams 4165, 4170 may form a pair of trusses. In particular, the pair of beams 4165, 4170 are preferably disposed in parallel to each other and are attached to the upper ends of the struts 4155, 4160 and posts 4145, 4150. The first linear crossmember 4180 preferably extends between upper ends of the posts 4145, 4150 while the second linear crossmember 4175 preferably extends between the upper ends of the struts 4155, 4160. The third linear crossmember 4185 may extend between posts 4155, 4160 and below the first linear crossmember 4180.

Like the previous embodiment, the legs 4130 are preferably structures that provide support to the frame 4100 along the edge of the pier 5000. The base plates 4135 preferably serve as a contact surface for the sidewall of a pier 5000 and provide sufficient strength and sturdiness. Specifically, the pair of legs 4130 may provide lateral support to the hanging columns 4115, 4120 against the sidewalls of the pier 5000. Like the pair of legs 3125 in the previous embodiment, the legs 4130 may couple near the lower ends of the hanging columns 4115, 4120 and may be disposed in parallel with each other. These legs 4130 are also preferably disposed in an orthogonal manner with respect to the hanging columns 4115, 4120, such that the legs 4130 may provide lateral support to the frame 4100.

Like the previous embodiment, the jacks 4125 are preferably devices configured to provide vertical support to the rectangular frame 4110 above ground. Importantly, the jacks 4125 are preferably located near the proximal end corners of the rectangular frame 4110 and preferably configured to lift the rectangular frame 4110. Exemplary embodiments of the jacks 4125 may be level jacks, leveling screw jacks, or jackscrews, which employ a screw thread or lead screw, and thus by turning the screw thread or leadscrew, the proximal end corners of the rectangular frame 4110 may be raised or lowered.

Like the hanging columns 4115, 4120, the jacks 4125 are preferably disposed in parallel to each other and are preferably orthogonal with respect to the rectangular frame 4110. To provide further vertical support to the rectangular frame 4110, the in-situ bollard tester 4000 may further comprise one or more pairs of dunnages 4133, which are preferably disposed beneath the rectangular frame, near the proximal end corners of the rectangular frame 4110, as shown in FIG. 15.

As discussed above, the cable 1200 may be a thick rope of wire, metal wire rope, or synthetic line used for coupling the bollard 500 to the in-situ bollard tester 4000 and testing the mooring capabilities of the bollard 500. The cable 1200 is preferably adapted to withstand high loads of tensioning, and the first end of the cable 1200 is preferably adapted to fasten onto the bollard 500 (e.g., lasso). The opposing end of the cable 1200 is preferably coupled to the tensioner 4300 in order to pull the cable 1200 and create and maintain cable tension to the cable 1200.

In various embodiments, the cable 1200 may be a rope, cord, cable, or strap. For rope embodiments, the cable 1200 may be braided in various ways, and a variety of rope materials may be used such as cotton, linen, silk, hemp, manila, jute, and steel. Synthetic fibers may also be used such as nylon and polyester, as well as a number of proprietary materials such as Kevlar® and Spectra®.

Like the previous embodiment, the tensioner 4300 may be a device that applies a force to create or maintain tension. FIG. 15 shows that an embodiment of the tensioner 4300 may be a winch centrally disposed at the proximate end of the in-situ bollard tester 4000. On a first end, the cable 1200 may operably couple to the tensioner 4300 or winch, whereas the opposing end of the cable 1200 may fasten to the bollard 500. Portions of the cable 1200 may also extend around one or more of the linear crossmembers 4175, 4180, 4185, as shown in FIG. 15. In this manner, the tensioner 4300 and linear crossmembers 4175, 4180, 4185 may provide tension to the cable 1200 and apply forces to the bollard 500 at various loading angles.

Figure 16:
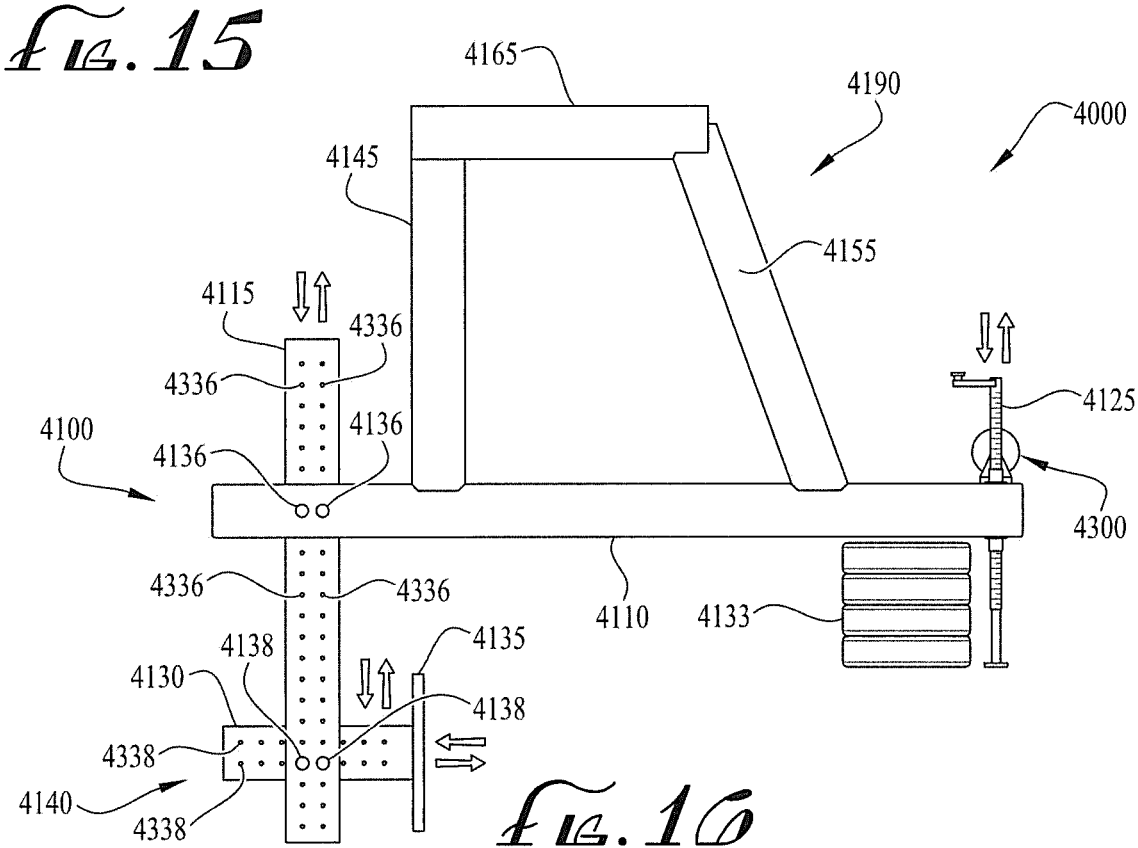
FIG. 16 is an illustration of a side view thereof and shows how the position of the legs, jacks, and hanging columns are adjustable.

FIG. 16 is an illustration of a side view of the fourth embodiment of the in-situ bollard tester 4000 and shows how the position of the legs 4130, jacks 4125, and hanging columns 4115, 4120 are adjustable. As shown in FIG. 16, a fourth embodiment of the in-situ bollard tester 4000 may comprise a frame 4100 having upper frame portion 4190 and a lower frame portion 4140. The upper frame portion 4190 may comprise a post 4150, strut 4155, and beam 4165. The lower frame portion 4140 may comprise a rectangular frame 4110, hanging column 4115, jacks 4125, legs 4130, and base plates 4135.

As discussed above, the jacks 4125 may employ a screw thread or lead screw, which, by turning the screw thread or leadscrew, may raise or lower the proximal end corners of the rectangular frame 3110. Notably, the in-situ bollard tester 4000 may also further comprise lock pins 4136 and mounting holes 4236 (shown in FIG. 18) located near distal end corners of the rectangular frame 4110. Each hanging column 4115, 4120 may moveably couple to the rectangular frame 4110 and may comprise holes 4336 that are evenly spaced and adapted to mate or engage with the lock pins 4136. In this manner, the vertical position of the hanging columns 4115, 4120 may lock and secure to the rectangular frame 4110, such that the frame 4100 may be adjustable in height.

Furthermore, the legs 4130 may comprise lock pins 4138 and holes 4338 located along the length of the legs 4130. Each leg 4130 may be moveably coupled to the hanging columns 4115, 4120, and the holes 4338 may be evenly spaced. The holes 4338 may also mate or engage with the lock pins 4138 via holes 4336 in order to securely lock the legs 4130 to the hanging columns 4115, 4120. In this manner, the vertical or lateral position of the frame 4100 may be adjusted.

Figure 17:
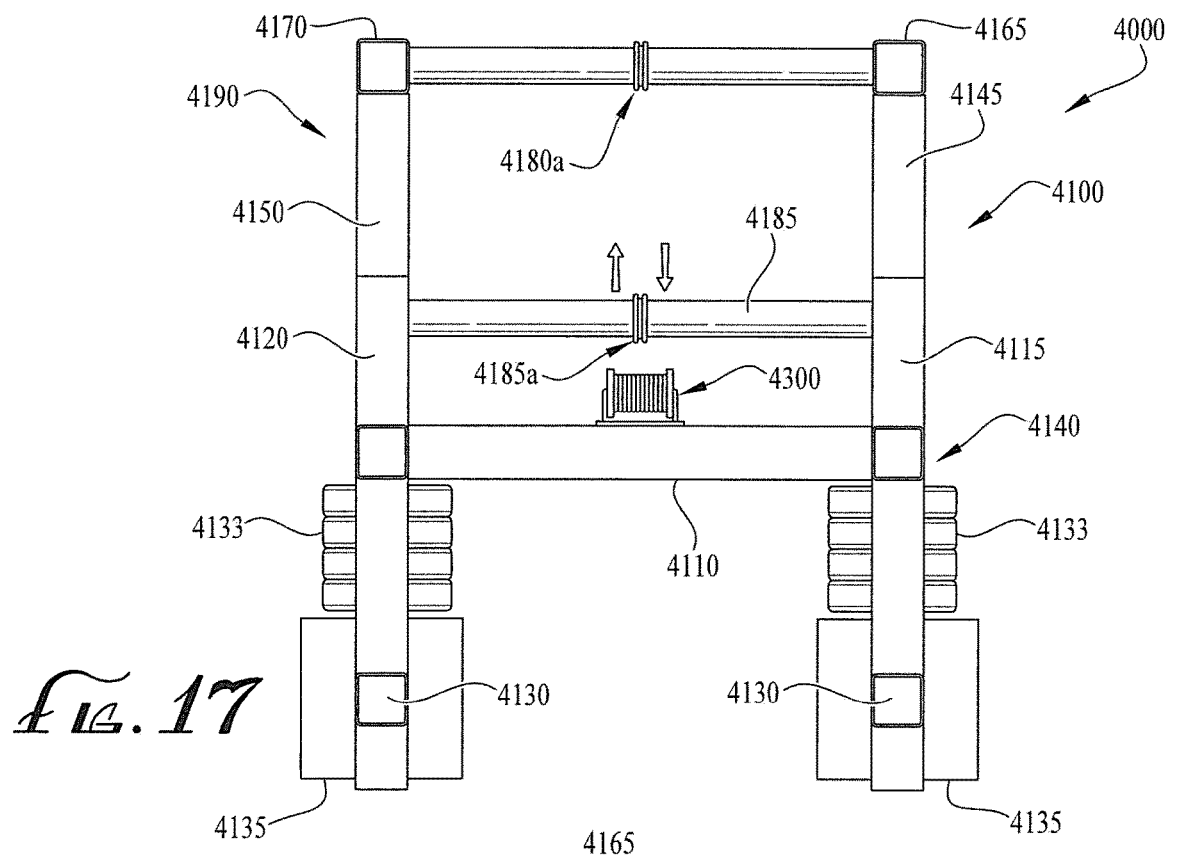
FIG. 17 is an illustration of a rear view thereof.

FIG. 17 is an illustration of a rear view of the fourth embodiment of the in-situ bollard tester 4000. As shown in FIG. 17, a fourth embodiment of the in-situ bollard tester 4000 may comprise a frame 4100 having an upper frame portion 4190, lower frame portion 4140, and tensioner 4300. FIG. 17 shows the tensioner 4300, which is preferably a winch, may be centrally disposed on the rectangular frame 4100. FIG. 17 also shows that embodiments of the linear crossmembers 4175, 4180, 4185 may comprise sheaves 4180*a*, 4185*a*, which may be a grooved wheel or pulley centrally disposed along the linear crossmembers 4175, 4180, 4185. Each of the sheaves 4180*a*, 4185*a* may be configured for guiding the cable 1200 and redirecting the cable 1200 directly away from the bollard 500. The sheaves 4180*a*, 4185*a* may also allow the cable 1200 to move freely, minimizing friction and wear on the cable 1200.

Figure 18:
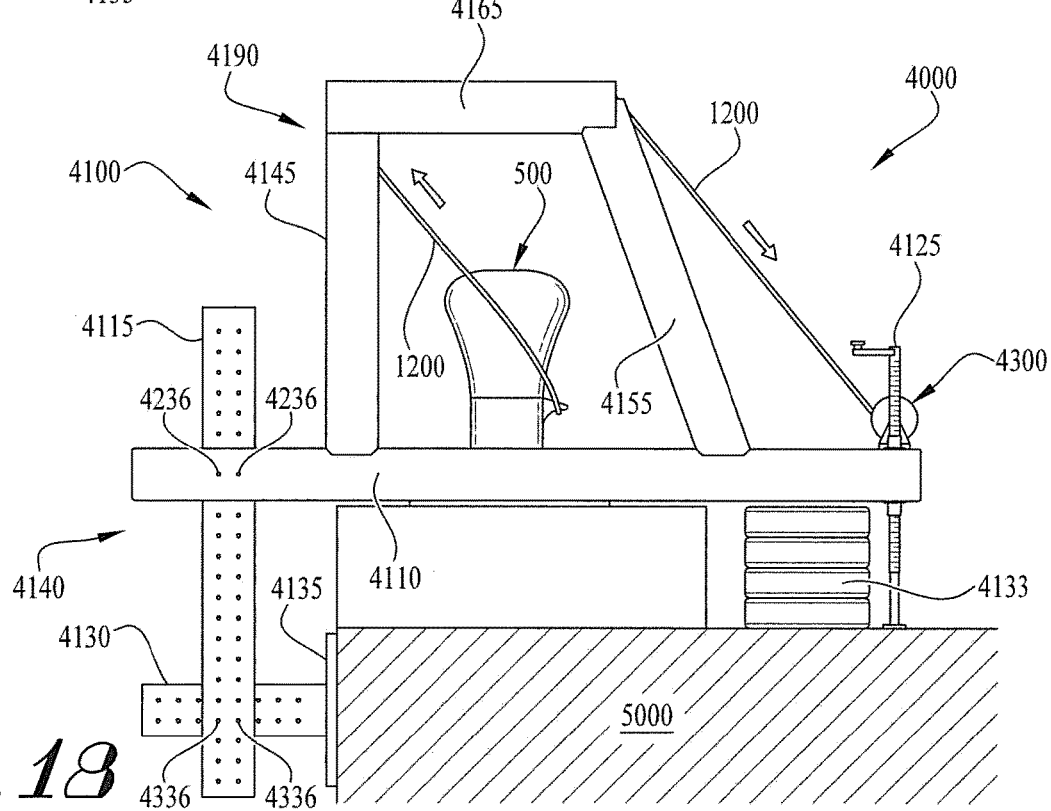
FIG. 18 is an illustration of a side view of the fourth embodiment of the in-situ bollard tester and shows the in-situ bollard tester mounted on a pier.

FIG. 18 is an illustration of a side view of the fourth embodiment of the in-situ bollard tester 4000 and shows the in-situ bollard tester 4000 mounted on a pier 5000. As shown in FIG. 18, a fourth embodiment of the in-situ bollard tester 4000 may comprise a tensioner 4300, cable 1200, and frame 4100. The frame 4100 may have an upper frame portion 4190 and a lower frame portion 4140, wherein the upper frame portion 4190 may comprise a post 4150, strut 4155, and beam 4170. The lower frame portion 4140 may comprise a rectangular frame 4110, hanging column 4115, jacks 4125, legs 4130, and base plates 4135. Additionally, one or more pairs of dunnages 4133 may be disposed beneath the rectangular frame.

Importantly, FIG. 18 shows how the cable 1200 may be operably coupled to the tensioner 4300 (e.g., winch) and bollard 500. In particular, a first end of the cable 1200 may be operably coupled to a winch, whereas the second end of the cable 1200 may be fastened to the bollard 500. Portions of the cable 1100 may also extend around one or more of the linear crossmembers 4175, 4180, 4185, (shown in FIG. 15). In this manner, the winch and linear crossmembers 4175, 4180, 4185 may provide tension to the cable 1200 and apply forces to the bollard 500 at various loading angles.

Figure 19:
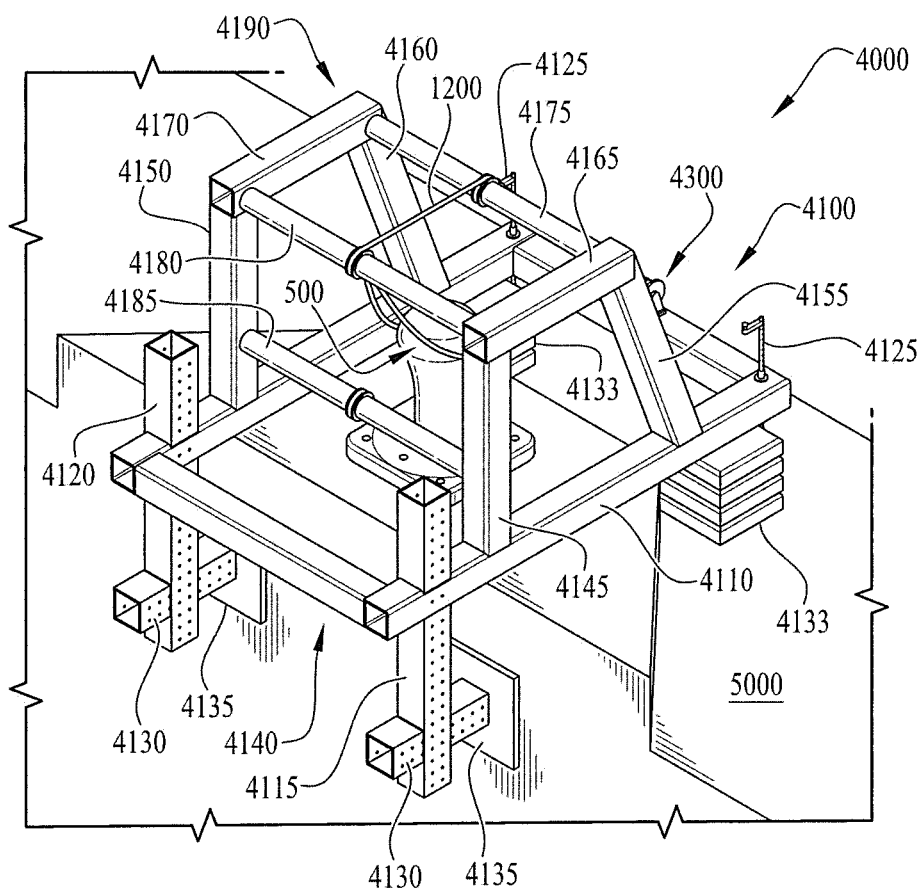
FIG. 19 is an illustration of arear perspective view thereof.

FIG. 19 is an illustration of a ear perspective view of the fourth embodiment of the in-situ bollard tester 2000. As shown in FIG. 19, another embodiment of the in-situ bollard tester 4000 may comprise a tensioner 4300, cable 1200, and frame 4100. The frame 4100 may have an upper frame portion 4190 and a lower frame portion 4140, wherein the upper frame portion 4190 may comprise posts 4145, 4150, struts 4155, 4160, and beams 4165, 4170. The lower frame portion 4140 may comprise a rectangular frame 4110, hanging columns 4115, 4120, jacks 4125, legs 4130, and base plates 4135. Here, FIG. 19 also shows how the cable 1200 extends around all three linear crossmembers 4175, 4180, 4185 and fastens onto the bollard 500. The tensioner 4300 or winch may pull the cable 1200 and, as a result, may apply tension to the cable 1200, thereby applying force at various load angles against the bollard 500. In this manner, the in-situ bollard tester 4000 may test the integrity of the bollard 500.

FIG. 20 is an illustration of a front perspective view of a fifth embodiment of an in-situ bollard tester 5001. As shown in FIG. 20, a fifth embodiment of the in-situ bollard tester 5001 may comprise a frame 5100, cable 1200, tensioner 5300, and tension rod 5195, 5198 (shown in FIG. 23). Like the previous embodiments, the frame 5100 may be a rigid structure configured to mount around a bollard 500 and onto an edge of a pier 5000 or wharf. The frame 5100 may have a pair of base assemblies 5140, 5190 arranged substantially in parallel—i.e., a first base assembly 5140 and a second base assembly 5190—and a spreader bar 5500 coupled to the pair of base assemblies 5140, 5190 via vertical brackets 5501. The tension rods 5195, 5198 may provide lateral support between the base assemblies 5140, 5190. The first tension rod 5195 may have opposing ends coupled near proximal ends of the first and second support frames 5150, 5200, whereas the second tension rod 5198 may be coupled near the distal ends of the first and second support frames 5150, 5200.

Importantly, the first base assembly 5140 may comprise a first support frame 5150, first cantilever arm 5115, jack 5125, and base plate 5135 (shown in FIG. 21). Similarly, the second base assembly 5190 may comprise a second support frame 5200, second cantilever arm 5120, jack 5125, and base plate 5135.

Figure 26:
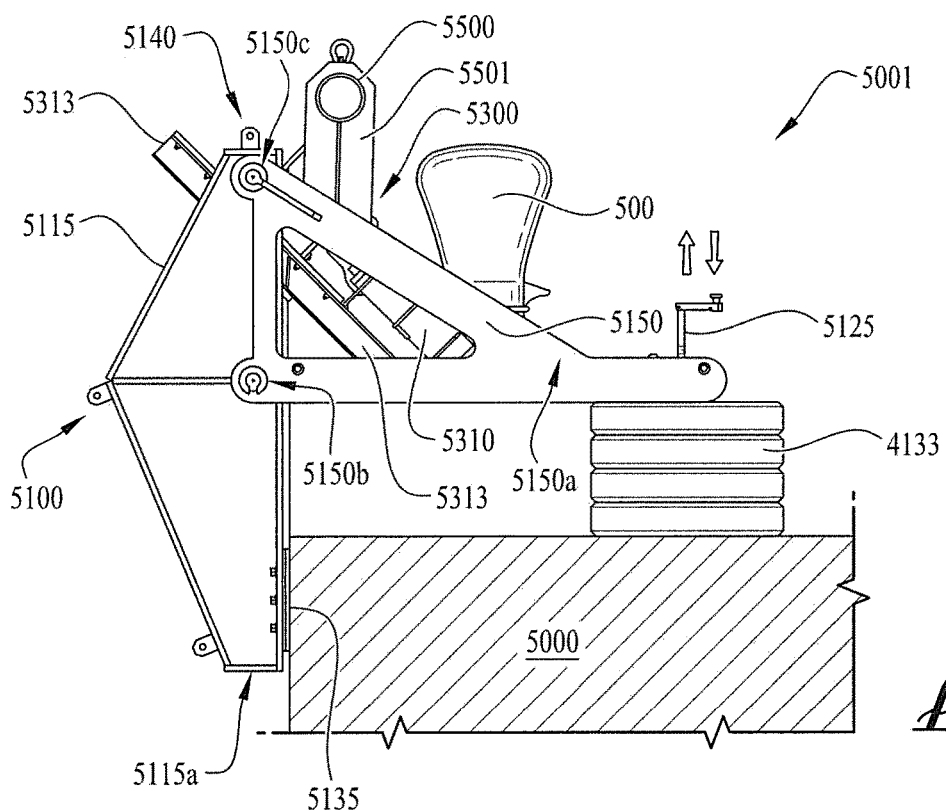
FIG. 26 is an illustration of a side view thereof.

The first support frame 5150 and second support frame 5200 may be structures that are substantially triangular in shape and may each have a first vertex 5150*a*, 5200*a*, second vertex 5150*b*, 5150*c*, and third vertex 5200*b*, 5200*c*. The first vertex 5150*a*, 5200*a* may be located near proximal ends of the first support frame 5150 and second support frame 5200, and the second vertex 5150*b*, 5200*b* and third vertex 5150*c*, 5200*c* may be located at the distal ends of the first support frame 5150 and second support frame 5200. In particular, as shown in FIGS. 21 and 26 below, the first and second support frames 5150, 5200 may each have at least one side disposed along a horizontal plane and traversing between the first vertex 5150*a*, 5200*d* and second vertex 5150*b*, 5200*b*. Additionally, the first and second support frames 5150, 5200 may also have a second side disposed along a vertical plane, traversing between the second vertex 5150*b*, 5200*b* and third vertex 5150*c*, 5200*c*. A third side of the first and second support frames 5150, 5200 may extend or traverse between the first vertex 5150*a*, 5200*a* and third vertex 5200*b*, 5200*c*.

The first cantilever arm 5115 and second cantilever arm 5120 may couple or attach to the first support frame 5150 and second support frame 5200, respectively, and may be parallel to each other. In various embodiments, the first cantilever arm 5115 and second cantilever arm 5120 may couple or attach to the first support frame 5150 and second support frame 5200 via the second vertex 5150*b*, 5200*b* and third vertex 5150*c*, 5200*c* via load pins. Preferably, as shown in FIGS. 20, 21, and 26, the first cantilever arm 5115 and second cantilever arm 5120 are oriented in an orthogonal manner with respect to the horizontal sides of the first support frame 5150 and second support frame 5200, respectively, such that the first cantilever arm 5115 and second cantilever arm 5120 may each have a projecting end 5115*a*, 5120*a* (shown in FIGS. 21 and 22, respectively) disposed substantially vertically downwards along a vertical plane. In this manner, the first cantilever arm 5115 and second cantilever arm 5120 may provide lateral support along an edge of a pier 5000. Preferably, the upper ends or upper portions of the first cantilever arm 5115 and second cantilever arm 5120 are coupled or attached to the second and third vertices 5150*b*, 5200*b*, 5150*c*, 5200*c* of the first support frame 5150 and second support frame 5200, respectively.

Like the hanging columns 1115, 1120, 2115, 2120, 3115, 3120, 4115, 4120 of the previous embodiments, the first and second cantilever arms 5115, 5120 may be disposed in an orthogonal manner with respect to at least one side of the first support frame 5150 and second support frame 5200. The first and second cantilever arms 5115, 5120 also preferably provide support to the frame 5100 along the edge of the pier 5000. The base plates 5135 may be disposed near the projecting ends of the first and second cantilever arms 5115, 5120 and preferably serve as a contact surface for the sidewall of the pier 5000. In this manner, the base plates 5135 may provide lateral support to the first and second cantilever arms 5115, 5120 against the sidewalls of the pier 5000.

Like the previous embodiments, the jacks 5125 are preferably devices configured to provide vertical support to the frame 5100 above ground and are preferably configured to lift the first support frame 5150 and second support frame 5200. Importantly, the jacks 5125 are preferably located near the proximal ends of the first support frame 5150 and second support frame 5200 (i.e., near the first vertex 5150*a*, 5200*a* of the first support frame 5150 and second support frame 5200). Exemplary embodiments of the jacks 5125 may be level jacks, leveling screw jacks, or jack screws, which employ a screw thread or lead screw, and thus by turning the screw thread or leadscrew, the proximal end corners of the first support frame 5150 and second support frame 5200 may be raised or lowered.

Like the cantilever arms 5115, 5120, the jacks 5125 are preferably disposed in parallel to each other and are preferably orthogonal with respect to the support frames 5150, 5200. To provide further vertical support to the frame 5100, the in-situ bollard tester 5001 may further comprise one or more pairs of dunnages 4133, which are preferably disposed beneath the frame 5100, near the proximal end corners of the support frames 5150, 5200, as shown in FIG. 20. Although FIG. 20 shows the in-situ bollard tester 5001 having dunnages 4133, various embodiments of the in-situ bollard tester may lack dunnages 4133.

As discussed above, the cable 1200 may be a thick rope of wire, metal wire rope, or synthetic line used for coupling the bollard 500 to the in-situ bollard tester 5001 and testing the mooring capabilities of the bollard 500. The cable 1200 is preferably adapted to withstand high loads of tensioning, and the cable 1200 may be fastened around the bollard 500. Further, opposing ends of the cable 1200 is preferably coupled to the tensioner 5300 in order to pull the cable 1200 and create and maintain cable tension to the cable 1200.

In various embodiments, the cable 1200 may be a rope, cord, cable, or strap. For rope embodiments, the cable 1200 may be braided in various ways, and a variety of rope materials may be used such as cotton, linen, silk, hemp, manila, jute, and steel. Synthetic fibers may also be used such as nylon and polyester, as well as a number of proprietary materials such as Kevlar® and Spectra®.

Like the previous embodiments, the tensioner 5300 may be one or more components configured to apply a force in order to create and maintain tension of the cable 1200. In the fifth embodiment shown in FIG. 20, the tensioner 5300 preferably comprises a pair of hydraulic arms 5310, pair of auxiliary arms 5305 (shown in FIGS. 23 and 25), pair of rails 5313, and a linear crossmember 5315. The pair of hydraulic arms 5310 may be disposed in parallel between the first and second support frames 5150, 5200 and each hydraulic arm 5310 may have a lower end pivotally coupled near the first vertices 5150*a*, 5200*a* of the first and second support frames 5150, 5200, respectively. Additionally, FIG. 20 shows that each hydraulic arm 5310 may have a lower end pivotally coupled to a bracket 5311, 5312, wherein each bracket 5311, 5312 is preferably located near the first vertices 5150*a*, 5200*a* of the first and second support frames 5150, 5200, respectively. The pair of rails 5313 may also be attached beneath the hydraulic arms 5310 and may extend therefrom in parallel relationship with the hydraulic arms 5310. In this manner, the rails 5313 may be arranged in parallel to each other and disposed in-between the first and second support frames 5150, 5200 beneath the hydraulic arms 5310. Notably, the linear crossmember 5315 may be in a sliding relationship with the rails 5313, such that the rails 5313 may be adapted to guide the linear crossmember 5315 when the linear crossmember 5315 slides along the rails 5313.

Opposing ends of the cable 1200 may operably couple to the linear crossmember 5315, which may be attached to the upper ends of both hydraulic arms 5310. A pair of shackles 1302 on the linear crossmember 5315 may be used to fasten or anchor the opposing ends of the cable 1200, and each shackle 1302 may comprise a loading pin 1303 (shown in FIG. 10) for measuring the tension or force on the cable 1200.

Figure 23:
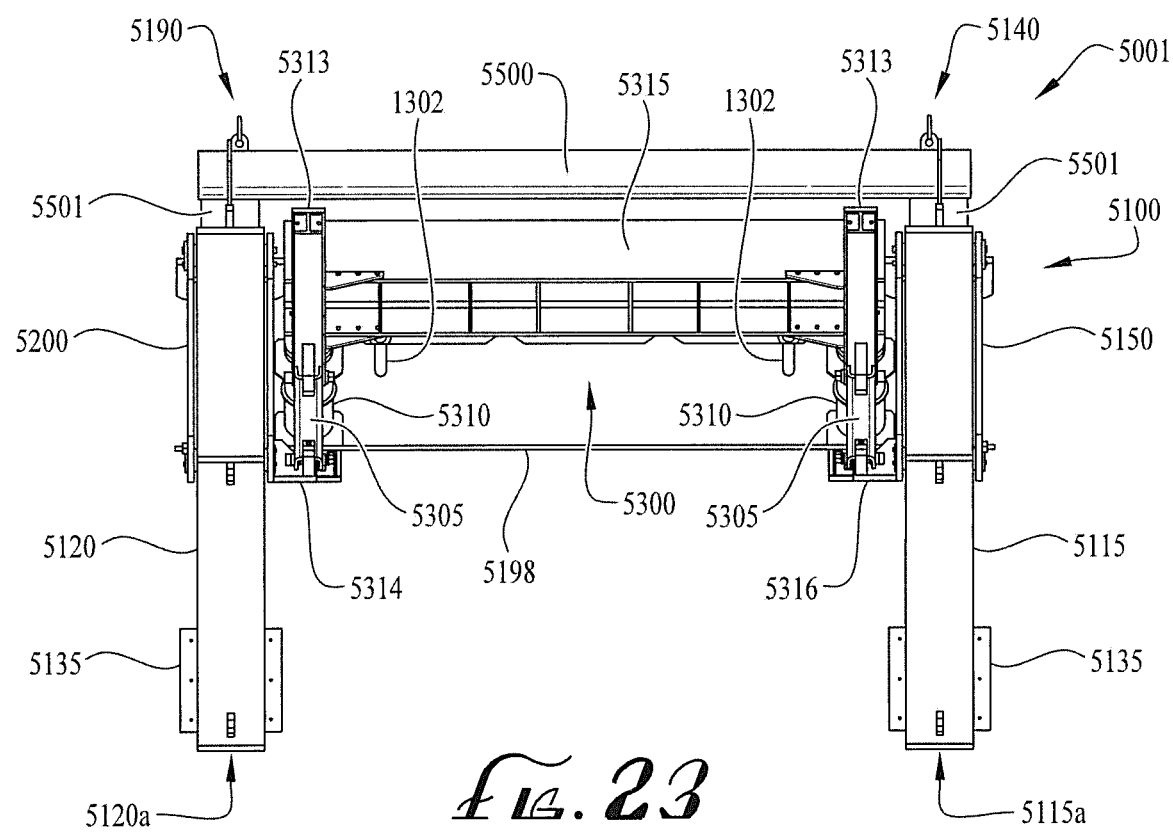
FIG. 23 is an illustration of a rear elevation view thereof.
Figure 25:
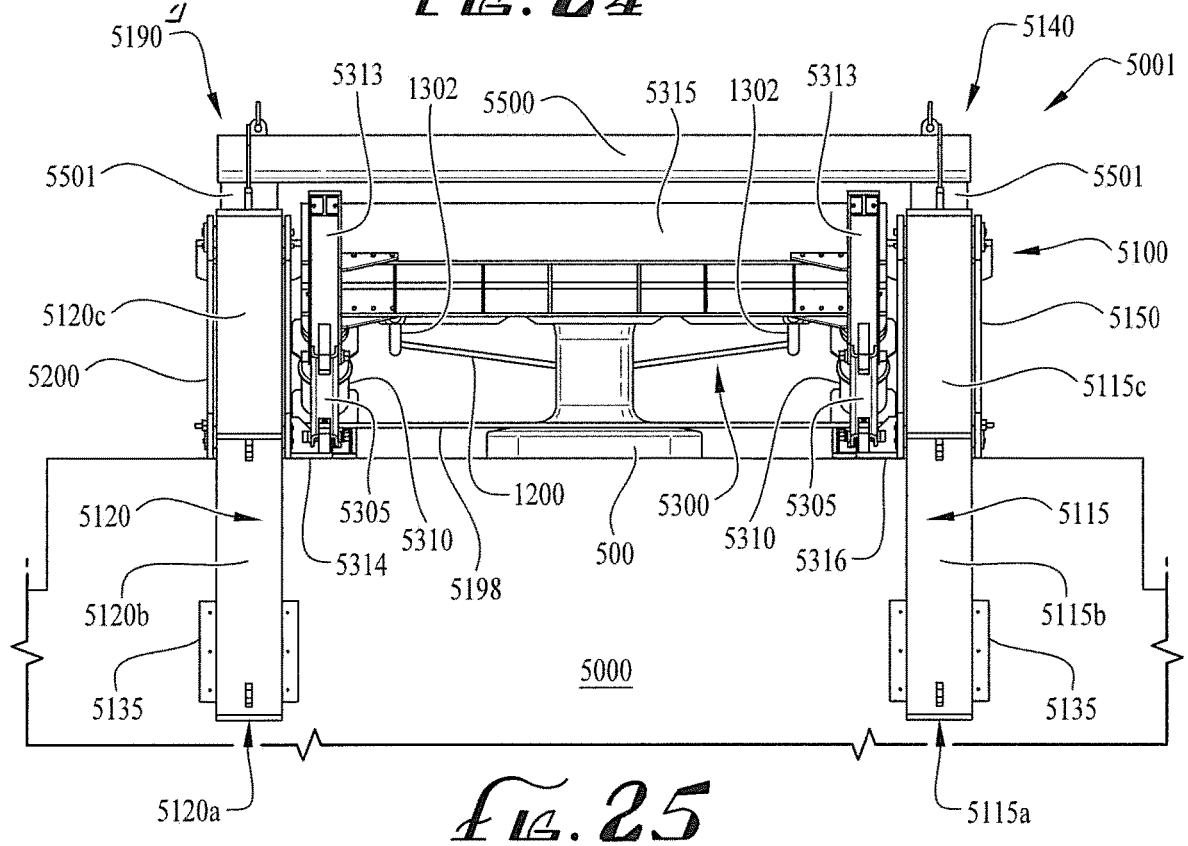
FIG. 25 is an illustration of a rear view thereof.

Importantly, the upper ends of the auxiliary arms 5305 may be pivotally coupled to midportions of the rails 5313 whereas the lower ends of the auxiliary arms 5305 may be pivotally coupled near the distal ends of the support frames 5150, 5200 via brackets 5314, 5316 (shown in FIGS. 23 and 25). In this manner, the auxiliary arms 5305 may provide vertical support to the hydraulic arms 5310 when the hydraulic arms 5310 drive the linear crossmember 5315 forward or rearward. As a result, the hydraulic arms 5310 may be in an angular relationship with the support frames 5150, 5200 when load testing a bollard 500.

Additionally, the slope or loading angle of the hydraulic arms 5310 may be adjustable. Specifically, the slope or loading angle of the hydraulic arms 5310 may be adjusted by pivoting the auxiliary arms 5305 forward or rearward, thereby adjusting the slope or loading angle of the hydraulic arms 5310. In this regard, by pivoting the auxiliary arms 5305 forward or rearward, the height of the linear crossmember 5315 may be adjusted, thereby allowing the hydraulic arms 5310 to drive the linear crossmember 5315 at various load angles.

In operation, opposing ends of the cable 1200 may couple to the linear crossmember 5315 via shackles 1302. While the cable 1200 is coupled to the linear crossmember 5315, the cable 1200 is preferably wrapped or fastened around the bollard 500. Thus, as the hydraulic arms 5310 drive the linear cross member 5315 towards the distal end of the frame 5100 and away from the bollard 500, force is applied to the cable 1200, creating and increasing cable tension. As tension of the cable 1200 increases, the loading pins 1303 located on the shackles 1302 may measure the cable tension. The operator may also visually inspect the bollard 500 during testing, FIG. 21 is an illustration of a side elevation view of the fifth embodiment of an in-situ bollard tester 5001 and shows how the jacks 5125 are adjustable. As shown in FIG. 21, a fifth embodiment of the in-situ bollard tester 5001 may comprise a frame 5100 and tensioning mechanism 5300. FIG. 21 shows that the frame 5100 may comprise a first base assembly 5140, vertical bracket 5501, and spreader bar 5500, wherein the first base assembly 5140 may comprise a first support frame 5150, first cantilever arm 5115, jack 5125, and base plate 5135.

Notably, FIG. 21 shows that the first cantilever arm 5115 may include a first base portion 5115*c* and a first cantilever portion 5115*b*. The first base portion 5115*c* may be coupled to the distal end of the first support frame 5150, and the first cantilever portion 5115*b* may project vertically downwardly and have a first projecting end 5115*a* substantially orthogonal to a horizontal plane. In this manner, the first projecting end 5115*a* may be substantially disposed along a vertical plane.

As discussed above, the jacks 5125 may employ a screw thread or lead screw, which by turning the screw thread or leadscrew, may raise or lower the proximal end corners of the first support frame 5150. In various embodiments, dunnages 4133 may also be placed beneath the first support frame 5150. The first cantilever arm 5115 and second cantilever arm 5120 may be vertically disposed in order to provide lateral support against the sidewalls of the pier 5000. As mentioned above, the first cantilever arm 5115 and second cantilever arm 5120 may include base plates 5135 to provide sufficient strength and surface area for contact along the ground and sidewall of the pier 5000.

Figure 22:
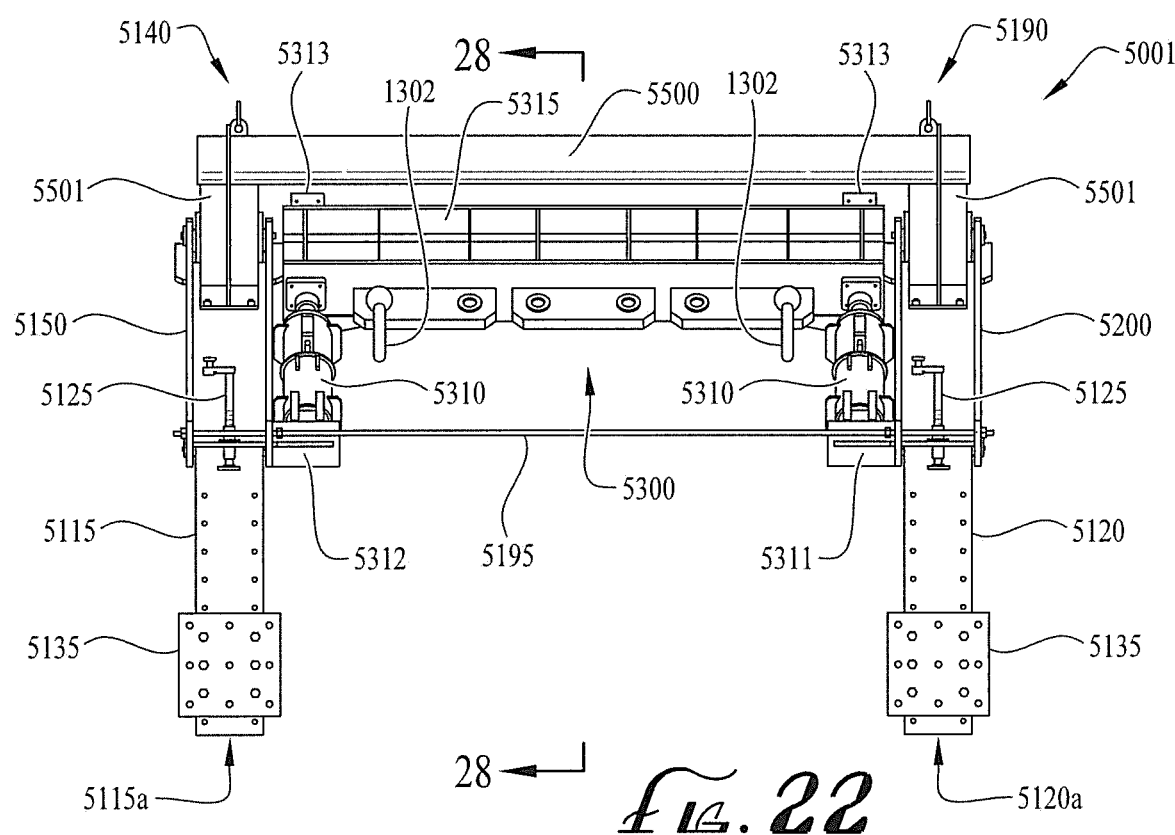
FIG. 22 is an illustration of a front elevation view thereof.

FIG. 22 is an illustration of a front elevation view of the fifth embodiment of an in-situ bollard tester 5001. As shown in FIG. 22, a fifth embodiment of the in-situ bollard tester 5001 may comprise a tensioner 5300, tension rod 5195, first base assembly 5140, second base assembly 5190, and spreader bar 5500. The first base assembly 5140 may comprise a first support frame 5150, first cantilever arm 5115, jack 5125, and base plate 5135. Similarly, the second base assembly 5190 may comprise a second support frame 5200, second cantilever arm 5120, jack 5125, and base plate 5135. A first tension rod 5195 may have opposing ends coupled near proximal ends of the first and second support frames 5150, 5200.

Notably, FIG. 22 shows that the tensioner 5300, which may comprise a pair of hydraulic arms 5310, pair of auxiliary arms 5305, and a linear crossmember 5315, which is preferably disposed between the first and second support frames 5150, 5200. Each hydraulic arm 5310 may also have a lower end pivotally coupled to a bracket 5311, 5312, and each bracket 5311, 5312 is preferably located near the proximal ends (i.e., first vertices 5150*a*, 5200*a*) of the first and second support frames 5150, 5200, respectively (see FIGS. 20 and 27). Each hydraulic arm 5310 may further comprise a rail 5313 extending from beneath the hydraulic arm 5310 (see FIG. 23), such that the rails 5313 may be arranged in parallel and disposed in-between the first and second support frames 5150, 5200. Notably, the linear crossmember 5315 may be in a sliding relationship with the rails 5313, such that the rails 5313 may be adapted to guide the linear crossmember 5315 when the linear crossmember 5315 slides along the rails 5313. In this manner, when a cable 1200 is coupled to the linear crossmember 5315, the tensioner 5300 may be configured to apply a force to the cable 1200 in order to create and maintain tension of the cable 1200.

FIG. 23 is an illustration of a rear elevation view of the fifth embodiment of an in-situ bollard tester 5001. As shown in FIG. 23, a fifth embodiment of the in-situ bollard tester 5001 may comprise a frame 5100, tensioner 5300, and tension rod 5198, wherein the frame 5100 may comprise a first base assembly 5140, second base assembly 5190, and spreader bar 5500. As shown in FIG. 23, the first base assembly 5140 may comprise a first cantilever arm 5115 and base plate 5135. Similarly, the second base assembly 5190 may comprise a second cantilever arm 5120 and base plate 5135. FIG. 23 shows that the second tension rod 5198 may have opposing ends coupled near distal ends of the first and second support frames 5150, 5200.

Importantly, FIG. 23 shows that the tensioner 5300 may further comprise auxiliary arms 5305 disposed substantially in parallel with respect to each other and in-between the first base assembly 5140 and second base assembly 5190. Each auxiliary arm 5305 may have a first end pivotally coupled to the rails 5313 of the tensioner 5300 and a second end pivotally coupled near the distal ends of the support frames 5150, 5200 via brackets 5314, 5316 located near the second vertices 5150*b*, 5200*b* of the first and second support frames 5150, 5200, respectively.

Figure 24:
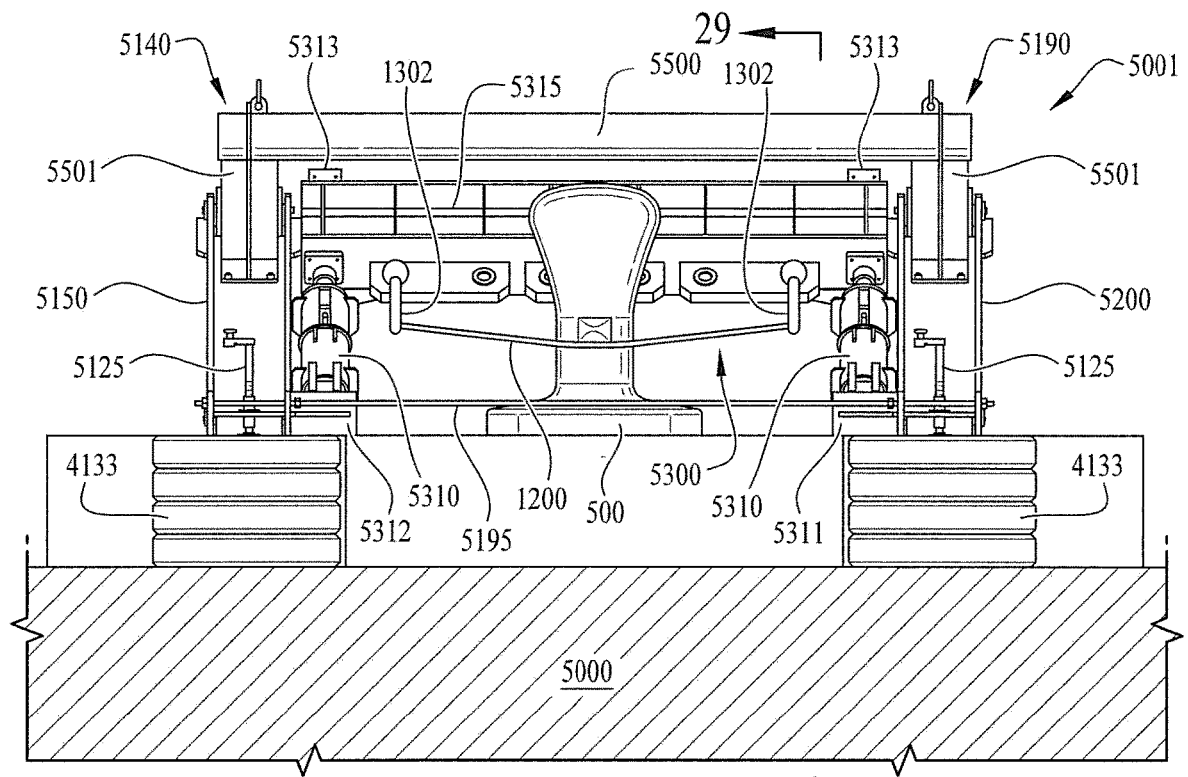
FIG. 24 is an illustration of a front view of the fifth embodiment of the in-situ bollard tester and shows the in-situ bollard tester mounted on a pier.

FIG. 24 is an illustration of a front view of the fifth embodiment of an in-situ bollard tester 5001 and shows the in-situ bollard tester mounted on a pier 5000. As shown in FIG. 24, a fifth embodiment of the in-situ bollard tester 5001 may comprise a tension rod 5195, first base assembly 5140, second base assembly 5190, spreader bar 5500, and vertical brackets 5501. The first base assembly 5140 may comprise a first support frame 5150 and jack 5125. Similarly, the second base assembly 5190 may comprise a second support frame 5200 and jack 5125.

Notably, FIG. 24 shows how the cable 1200 is installed onto the in-situ bollard tester 5001 and bollard 500. As shown in FIG. 24, opposing ends of the cable 1200 may couple to the linear crossmember 5315 via shackles 1302. While the cable 1200 is coupled to the linear crossmember 5315, the cable 1200 is preferably wrapped or fastened around the bollard 500. The rails 5313, which are preferably in a sliding relationship with the linear crossmember 5315, may guide the linear crossmember 5315 when the tensioner 5300 applies a tension force to the cable 1200. Thus, as the hydraulic arms 5310 drive the linear cross member 5315 towards the distal end of the frame 5100 and away from the bollard 500, force is applied to the cable 1200, creating and increasing cable tension. As tension of the cable 1200 increases, the loading pins 1303 located on the shackles 1302 may measure the cable tension. The operator may also visually inspect the bollard 500 during testing.

FIG. 25 is an illustration of a rear view of the fifth embodiment of an in-situ bollard tester 5001 and shows the in-situ bollard tester mounted on a pier 5000. As shown in FIG. 25, a fifth embodiment of the in-situ bollard tester 5001 may comprise a frame 5100, tensioner 5300, and second tension rod 5198, wherein the frame 5100 may comprise a first base assembly 5140, second base assembly 5190, and spreader bar 5500. The first base assembly 5140 may comprise a first cantilever arm 5115 and base plate 5135. Similarly, the second base assembly 5190 may comprise a second cantilever arm 5120 and base plate 5135. Opposing ends of the cable 1200 may couple to the tensioner 5300 via the linear crossmember 5315 and shackles 1302.

Notably, FIG. 25 shows how the first cantilever arm 5115 and second cantilever arm 5120 may comprise base portions 5115c, 5120c and cantilever portions 5115b, 5120b. Specifically, the first cantilever arm 5115 may include a first base portion 5115c coupled to the distal end of the first support frame 5150 and a first cantilever portion 5115b projecting vertically downwardly. The first cantilever portion 5115b may also have a first projecting end 5115a, preferably orthogonal to at least one side of the first support frame 5150 that is disposed substantially along a horizontal plane. In this manner, the first projecting end 5115a may be disposed along a vertical plane.

Similarly, the second cantilever arm 5120 may include a second base portion 5120c and a second cantilever portion 5120b, wherein the second base portion 5120c may be coupled to the distal end of the first support frame 5200, and the second cantilever portion 5120b may project vertically downwardly. The second cantilever portion 5120b may also have a second projecting end 5120a orthogonal to at least one side of the second support frame 5200 that is disposed substantially along a horizontal plane. In this manner, the second projecting end 5120a may be disposed along a vertical plane.

FIG. 25 also shows how the first and second cantilever arms 5115, 5120 may provide support to the frame 5100 along the edge of the pier 5000. Like the hanging columns 1115, 1120, 2115, 2120, 3115, 3120, 4115, 4120 of the previous embodiments, the first and second cantilever arms 5115, 5120 may be disposed in an orthogonal manner with respect to at least one side of the first support frame 5150 and second support frame 5200. The base plates 5135 located near the projecting ends 5115a, 5120a of the first and second cantilever arms 5115, 5120 may serve as a contact surface for the sidewall of a pier 5000. In this manner, the base plates 5135 may provide lateral support to the first and second cantilever arms 5115, 5120 against the sidewalls of the pier 5000.

FIG. 26 is an illustration of a side view of the fifth embodiment of the in-situ bollard tester 5001 and shows the in-situ bollard tester 5001 mounted on a pier 5000. As shown in FIG. 26, a fifth embodiment of the in-situ bollard tester 5001 may comprise a frame 5100 and tensioner 5300. The frame 5100 may comprise a first base assembly 5140, spreader bar 5500, and the first base assembly 5140 may comprise a first support frame 5150, first cantilever arm 5115, jack 5125, and base plate 5135. Additionally, in various embodiments, one or more pairs of dunnages 4133 may be disposed beneath the frame 5100, and more particularly, the first support frame 5150 and second support frame 5200. The first cantilever arm 5115 and second cantilever arm 5120 may be vertically oriented in order to provide lateral support against the sidewalls of the pier 5000. The first cantilever arm 5115 and second cantilever arm 5120 may include base plates 5135 to provide sufficient strength and surface area for contact along the ground and sidewall of the pier 5000.

Importantly, FIG. 26 shows that the jacks 5125 may be adjusted in height, such that the tensioner 5300 is preferably about the same elevation as the bollard 500. In particular, the frame 5100 is preferably adjusted, such that the first support frame 5150 and second support frame 5200 may be leveled and substantially surround the bollard 500 while the tensioner 5300 may be adjusted at an elevation about the same height as the bollard 500. In this regard, the hydraulic arms 5310 may slope at an angle with the lower ends of the hydraulic arms 5310 about the same height as the lower end of the bollard 500 and the upper ends of the hydraulic arms 5310 about the same height as the top of the bollard 500. The dunnages 4133 and jacks 5125 are also preferably adjusted at a length and height, respectively, such that the frame 5100 remains substantially leveled at a horizontal level that is parallel with the ground.

Figure 27:
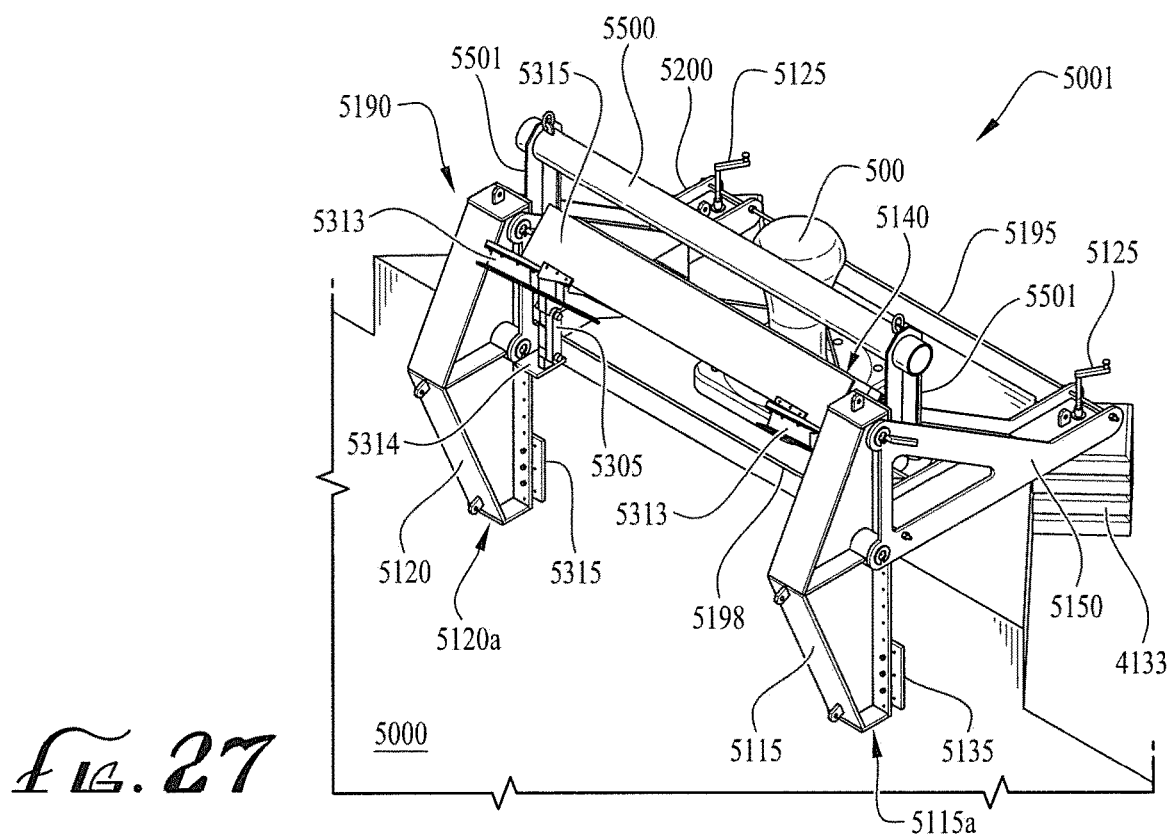
FIG. 27 is an illustration of a rear perspective view thereof.

FIG. 27 is an illustration of a rear perspective view of the fifth embodiment of the in-situ bollard tester. As shown in FIG. 27, a fifth embodiment of the in-situ bollard tester 5001 may comprise a tension rod 5198, base assemblies 5140, 5190 and a spreader bar 5500 coupled to the base assemblies 5140, 5190 via vertical brackets 5501. The base assemblies 5140, 5190 may comprise a support frames 5150, 5200 and cantilever arms 5115, 5120.

Here, FIG. 27 shows the in-situ bollard tester 5001 surrounding the bollard 500. A cable 1200 may also fasten against the bollard 500. When the tensioner 5300 pulls the cable 1200, tension to the cable 1200 may result, thereby applying force at various load angles against the bollard 500. In this manner, the in-situ bollard tester 5001 may test the integrity of the bollard 500.

Figure 28:
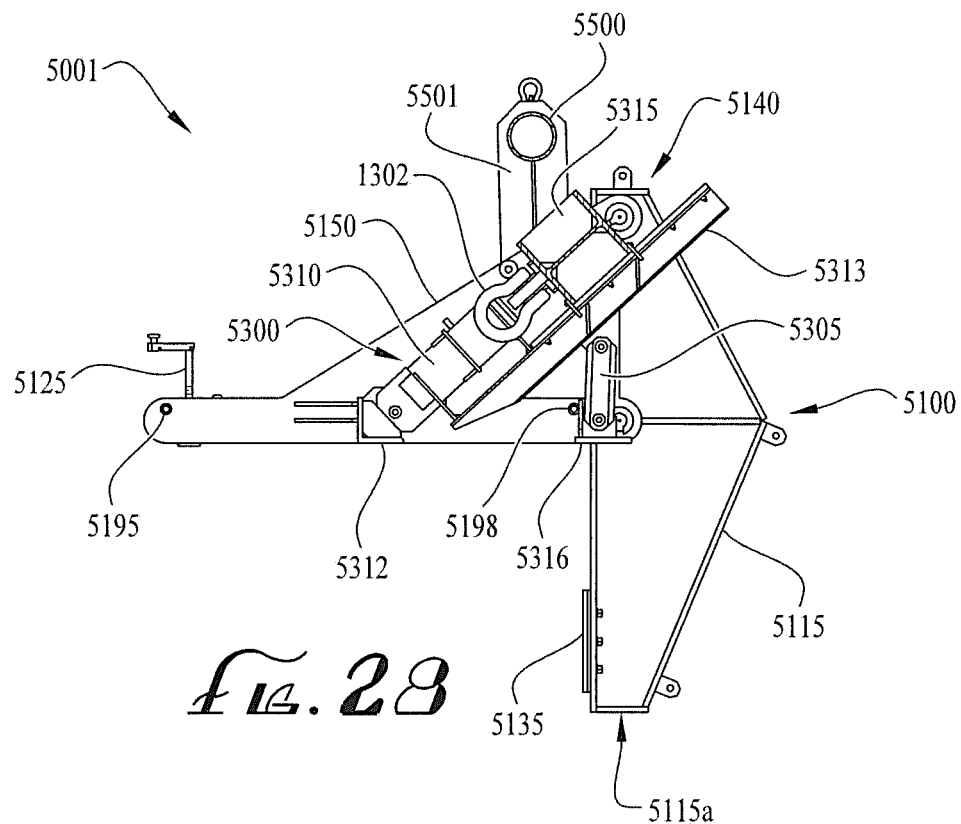
FIG. 28 is an illustration of across section view of the fifth embodiment of the in-situ bollard tester taken from FIG. 22.

FIG. 28 depicts a cross section view of the fifth embodiment of the in-situ bollard tester taken from FIG. 22. As shown in FIG. 28, a fifth embodiment of the in-situ bollard tester 5001 may comprise a tensioner 5300, frame 5100, first tension rod 5195, and second tension rod 5198, wherein the frame 5100 may comprise a base assembly 5140 and spreader bar 5500 coupled to the base assembly 5140 via vertical bracket 5501. The base assembly 5140 may comprise a support frame 5150, cantilever arm 5115, base plate 5135, and jack 5125. The tensioner 5300 may comprise a hydraulic arm 5310, auxiliary arm 5305, rail 5313, linear crossmember 5315, and shackle 1302.

Importantly, FIG. 28 shows how the hydraulic arms 5310 and auxiliary arms 5305 are pivotally coupled to the support frames 5150, 5200. Specifically, the lower end of the hydraulic arm 5310 may be pivotally coupled to the support frame 5150 via bracket 5312, and the upper end of the hydraulic arm 5310 may be coupled to the linear crossmember 5315. Additionally, the first end of the auxiliary arm 5305 may be pivotally coupled to the midportion of the rail 5313, and the second end of the auxiliary arm 5305 may be pivotally coupled to the support frame 5150 via bracket 5316. Notably, FIG. 28 shows that a first end portion of the rail 5313 if preferably attached beneath the hydraulic arm 5310, and that the linear crossmember 5315 may be in a sliding relationship with the rail 5313.

Figure 29:
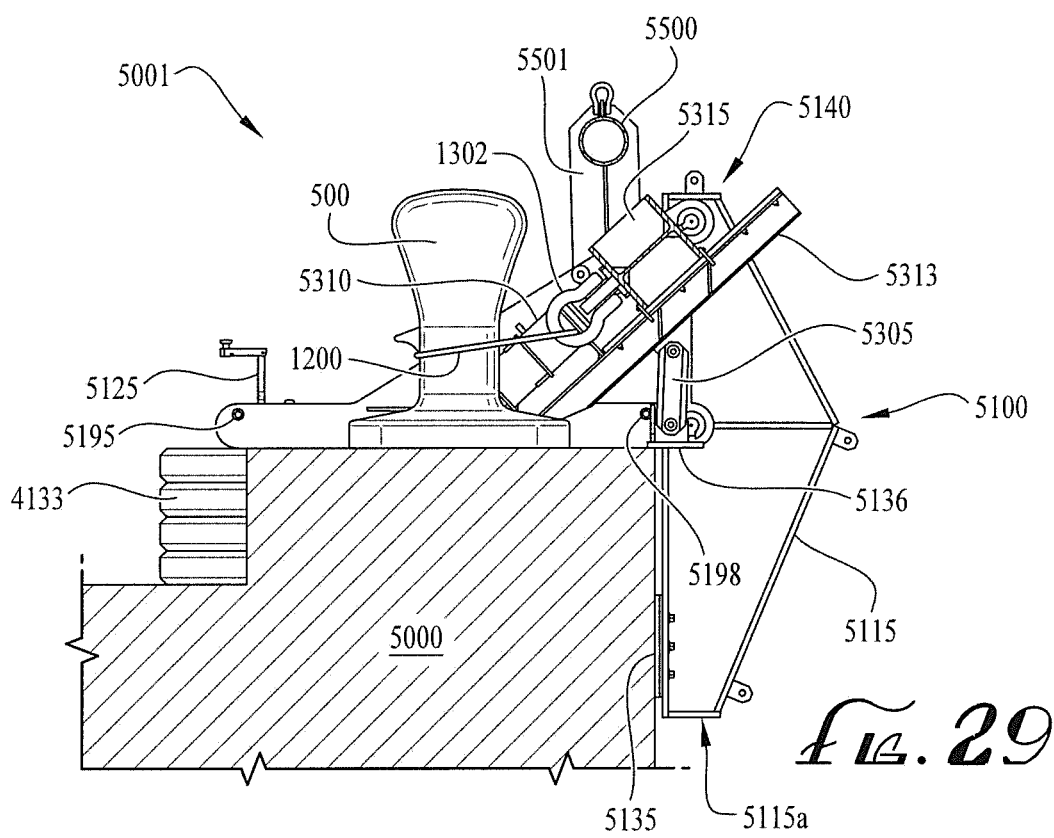
FIG. 29 is an illustration of a cross section view of the fifth embodiment of the in-situ bollard tester taken from FIG. 24 and shows the in-situ bollard tester mounted on a pier.

FIG. 29 is an illustration of a cross section view of the fifth embodiment of the in-situ bollard tester taken from FIG. 24 and shows the in-situ bollard tester mounted on a pier. As shown in FIG. 29, a fifth embodiment of the in-situ bollard tester 5001 may comprise a cable 1200, frame 5100, first tension rod 5195, second tension rod 5198, hydraulic arm 5310, auxiliary arm 5305, rail 5313, linear crossmember 5315, shackle 1302, and one or more pairs of dunnages 4133 beneath the frame 5100. The frame 5100 may comprise a base assembly 5140 and spreader bar 5500 coupled to the base assembly 5140 via vertical bracket 5501. The base assembly 5140 may comprise a support frame 5150, cantilever arm 5115, base plate 5135, and jack 5125.

Importantly, FIG. 29 shows how the in-situ bollard tester 5001 may test the integrity of the bollard 500. Here, the hydraulic arms 5310 preferably drives the linear crossmember 5315 towards the distal end of the frame 5100 along the rails 5313. This may cause the center portion of the cable 1200 to exert force against the bollard 500. The angular relation between the hydraulic arms 5310 and the rectangular frame 5100 may also allow the in-situ bollard tester 5001 to apply an upward force or angular load, which may help determine the integrity of the bollard 500. As the linear crossmember 5315 moves away from the bollard 500, tension of the cable 1200 increases and may be measured by the loading pins 1303. The operator may also visually inspect the bollard 500 during testing. The position of the jacks 5125 and angular orientation of the hydraulic arms 5310 may be adjusted to accommodate various load angles used against the bollard 500.

The foregoing description of the embodiments of the in-situ bollard tester has been presented for the purposes of illustration and description. While multiple embodiments of the in-situ bollard tester are disclosed, other embodiments will become apparent to those skilled in the art from the above detailed description. As will be realized, these embodiments are capable of modifications in various obvious aspects, all without departing from the spirit and scope of the present disclosure. Accordingly, the detailed description is to be regarded as illustrative in nature and not restrictive.

Although embodiments of the in-situ bollard tester are described in considerable detail, other versions are possible such as, for example, orienting and/or attaching the in-situ bollard tester in a different fashion. Therefore, the spirit and scope of the appended claims should not be limited to the description of versions included herein.

Except as stated immediately above, nothing, which has been stated or illustrated, is intended or should be interpreted to cause a dedication of any component, step, feature, object, benefit; advantage, or equivalent to the public, regardless of whether it is or is not recited in the claims. The scope of protection is limited solely by the claims that now follow, and that scope is intended to be broad as is reasonably consistent with the language that is used in the claims. The scope of protection is also intended to be broad to encompass all structural and functional equivalents.

The invention claimed is:

1. An in-situ bollard tester, comprising:
   a frame, comprising:
      a pair of base assemblies arranged in parallel, each comprising:
         a support frame having at least one side disposed along a horizontal plane; and
         a cantilever arm attached to a distal end of said support frame and having a projecting end disposed along a vertical plane; and
      a spreader bar coupled to said pair of base assemblies;
   a tensioner comprising:
      a pair of hydraulic arms disposed in parallel between said pair of support frames and each having a lower end pivotally coupled near proximal ends of said pair of support frames, said pair of hydraulic arms being in an angular relationship with said horizontal plane; and
      a linear crossmember attached to upper ends of said pair of hydraulic arms; and
   a cable having first and second ends coupled near opposing ends of said linear crossmember.

2. The in-situ bollard tester, according to claim 1, further comprising a pair of jacks coupled near said proximal ends of said support frames.

3. The in-situ bollard tester, according to claim 1, wherein said tensioner further comprises a pair of rails having first end portions extending from beneath said pair of hydraulic arms; and
   wherein said linear crossmember is in a sliding relationship with said pair of rails, such that said pair of rails are adapted to guide said linear crossmember.

4. The in-situ bollard tester, according to claim 3, wherein said tensioner further comprises a pair of auxiliary arms having first ends pivotally coupled to midportions of said pair of rails and second ends pivotally coupled near distal ends of said pair of support frames.

5. The in-situ bollard tester, according to claim 1, further comprising a pair of shackles coupled near opposing ends of said linear crossmember and each having a load pin sensor adapted for measuring a cable tension; and
   wherein said opposing ends of said cables are coupled to said pair of shackles, such that said load pin sensors are adapted to measure said cable tension of said cable.

6. The in-situ bollard tester, according to claim 1, further comprising:
   a first tension rod having opposing ends coupled near proximal ends of said pair of support frames; and
   a second tension rod having opposing ends coupled near distal ends of said pair of support frames.

7. The in-situ bollard tester, according to claim 1, wherein said projecting ends of said pair of cantilever arms comprise base plates.

8. An in-situ bollard tester, comprising:
   a frame, comprising:
      first and second base assemblies arranged in parallel; and
      a spreader bar coupled to said first and second base assemblies;
      wherein said first base assembly comprises:
         a first support frame substantially triangular in shape and having a first vertex near a proximal end and second and third vertices near a distal end, said first support frame having at least one side disposed along a horizontal plane; and
         a first cantilever arm coupled to said distal end of said first support frame and having a projecting end disposed along a vertical plane;
      wherein said second base assembly comprises:
         a second support frame substantially triangular in shape and having a first vertex near a proximal end and second and third vertices near a distal end, said second support frame having at least one side disposed along said horizontal plane; and
         a second cantilever arm coupled to said distal end of said second support frame and having a projecting end disposed along said vertical plane;
   a tensioner comprising:
      first and second hydraulic arms disposed in parallel between said first and second support frames and each having lower ends pivotally coupled near said first vertices of said first and second support frames, respectively, said first and second hydraulic arms being in an angular relationship with said horizontal plane;
      a linear crossmember attached to upper ends of said first and second hydraulic arms; and
      a cable having first and second ends coupled near opposing ends of said linear crossmember.

9. The in-situ bollard tester, according to claim 8, further comprising a pair of jacks coupled near said proximal ends of said first and second support frames.

10. The in-situ bollard tester, according to claim 8, wherein said tensioner further comprises first and second rails, respectively;

wherein first end portions of said first and second rails are attached beneath said first and second hydraulic arms and extend therefrom, respectively; and wherein said linear crossmember is in a sliding relationship with said first and second rails, such that said first and second rails are adapted to guide said linear crossmember.

11. The in-situ bollard tester, according to claim 10, wherein said tensioner further comprises first and second auxiliary arms, each having a first end and a second end;

wherein said first ends of said first and second auxiliary arms are pivotally coupled to midportions of said first and second rails, respectively; and wherein said second ends of said first and second auxiliary arms are pivotally coupled near distal ends of said first and second support frames, respectively.

12. The in-situ bollard tester, according to claim 8, wherein said linear crossmember further comprises a plurality of mounting holes disposed along therewith; and wherein said in-situ bollard tester further comprises a pair of shackles adapted to couple to said plurality of mounting holes, each of said pair of shackles having a load pin sensor adapted for measuring a cable tension; and wherein said opposing ends of said cables are coupled to said pair of shackles, such that said load pin sensors are adapted to measure-said cable tension of said cable.

13. The in-situ bollard tester, according to claim 8, further comprising:

a first tension rod having opposing ends coupled near proximal ends of first and second support frames; and a second tension rod having opposing ends coupled near distal ends of said first and second support frames.

14. The in-situ bollard tester, according to claim 8, wherein said projecting ends of said first and second cantilever arms comprise a base plates.

15. An in-situ bollard tester, comprising:

a frame, comprising:

first and second base assemblies arranged substantially in parallel; and a spreader bar coupled to top portions of said first and second base assemblies;

wherein said first base assembly comprises:

a first support frame substantially triangular in shape and having a first vertex near a proximal end and second and third vertices near a distal end, said first support frame having at least one side disposed along a horizontal plane; and a first cantilever arm comprising a first base portion and a first cantilever portion, said first base portion being coupled to said distal end of said first support frame and said first cantilever portion projecting vertically downwardly and having a first projecting end being orthogonal to said horizontal plane, such that said first projecting end is disposed along a vertical plane;

wherein said second base assembly comprises:

a second support frame substantially triangular in shape and having a first vertex near a proximal end and second and third vertices near a distal end, said second support frame having at least one side disposed along said horizontal plane; and a second cantilever arm comprising a second base portion and a second cantilever portion, said second base portion being coupled to said distal end of said second support frame and said second cantilever portion projecting vertically downwardly and having a second projecting end being orthogonal to said horizontal plane, such that said second projecting end is disposed along said vertical plane;

a tensioner comprising:

a first hydraulic arm having a lower end pivotally coupled near said first vertex of said first support frame and in an angular relationship with said horizontal plane;

a second hydraulic arm having a lower end pivotally coupled near said first vertex of said second support frame and in an angular relationship with said horizontal plane; and a linear crossmember having opposing ends attached to upper ends of said first and second hydraulic arms;

wherein said first and second hydraulic arms are disposed in parallel between said first and second support frames; and a cable having first and second ends coupled near opposing ends of said linear crossmember.

16. The in-situ bollard tester, according to claim 15, further comprising a pair of jacks coupled near said proximal ends of said first and second support frames.

17. The in-situ bollard tester, according to claim 15, wherein said tensioner further comprises first and second rails, respectively;

wherein first end portions of said first and second rails are attached beneath said first and second hydraulic arms and extend therefrom, respectively; and wherein said linear crossmember is in a sliding relationship with said first and second rails, such that said first and second rails are adapted to guide said linear crossmember.

18. The in-situ bollard tester, according to claim 17, wherein said tensioner further comprises first and second auxiliary arms;

wherein said first auxiliary arm has a first end pivotally coupled to a midportion of said first rail and a second end pivotally coupled near said second vertex of said first support frame; and wherein said second auxiliary arm has a first end pivotally coupled to a midportion of said second rail and a second end pivotally coupled near said second vertex of said second support frame.

19. The in-situ bollard tester, according to claim 15, wherein said linear crossmember further comprises a plurality of mounting holes disposed along therewith; and wherein said in-situ bollard tester further comprises a pair of shackles adapted to couple to said plurality of mounting holes via a pair of lock pins, each of said pair of shackles having a load pin sensor adapted for measuring a cable tension; and wherein said opposing ends of said cables are coupled to said pair of shackles, such that said load pin sensors are adapted to measure said cable tension of said cable.

20. The in-situ bollard tester, according to claim 15, further comprising:

a first tension rod having opposing ends coupled near proximal ends of said first and second support frames; and a second tension rod having opposing ends coupled near distal ends of said first and second support frames.

* * * * *